(12) United States Patent
Louis et al.

(10) Patent No.: US 12,383,854 B2
(45) Date of Patent: Aug. 12, 2025

(54) CLAMP SYSTEM AND FILTER ARRANGEMENT AND METHODS

(71) Applicant: Donaldson Company, Inc., Bloomington, MN (US)

(72) Inventors: Dominique Louis, Brussels (BE); Wim V. Van Gelder, Kessel-Lo (BE); Benjamin M. Nicols, Bierbeck (BE); Rakesh K Yadav, Lakeville, MN (US); Oliver Ronneau, Chapelle-Lez-Herlaimont (BE)

(73) Assignee: Donaldson Company, Inc., Bloomington, MN (US)

( * ) Notice: Subject to any disclaimer, the term of this patent is extended or adjusted under 35 U.S.C. 154(b) by 408 days.

(21) Appl. No.: 18/000,788

(22) PCT Filed: Jun. 4, 2021

(86) PCT No.: PCT/US2021/036006
§ 371 (c)(1),
(2) Date: Dec. 5, 2022

(87) PCT Pub. No.: WO2021/248070
PCT Pub. Date: Dec. 9, 2021

(65) Prior Publication Data
US 2023/0211271 A1 Jul. 6, 2023

Related U.S. Application Data

(60) Provisional application No. 63/140,020, filed on Jan. 21, 2021, provisional application No. 63/035,412, filed on Jun. 5, 2020.

(51) Int. Cl.
*B01D 46/42* (2006.01)
*B01D 46/00* (2022.01)
(Continued)

(52) U.S. Cl.
CPC ..... *B01D 46/4227* (2013.01); *B01D 46/0005* (2013.01); *B01D 46/023* (2013.01);
(Continued)

(58) Field of Classification Search
CPC .. B01D 46/12; B01D 46/121; B01D 46/4227; B01D 46/0005; B01D 46/023;
(Continued)

(56) References Cited

U.S. PATENT DOCUMENTS 7,334,490 B2   2/2008   Morse et al.
7,931,723 B2   4/2011   Cuvelier
(Continued)

FOREIGN PATENT DOCUMENTS

WO   2012/164087 A1   12/2012
WO   2016/045730 A1   3/2016

OTHER PUBLICATIONS

International Search Report and Written Opinion for PCT/US2021/036006 (Sep. 17, 2021).

*Primary Examiner* — Robert Clemente
(74) *Attorney, Agent, or Firm* — Merchant & Gould P.C.

(57) ABSTRACT

A filter system and clamp system for a gas turbine air inlet uses a single clamp system that allows for securing in place both a first element and a second element on the grid of the gas turbine air inlet. The clamp system can be released to allow for services of the first filter element, while the second filter element remains in sealing engagement with the grid.

19 Claims, 37 Drawing Sheets

(51) Int. Cl.
  *B01D 46/02* (2006.01)
  *B01D 46/121* (2022.01)
  *F02C 7/055* (2006.01)

(52) U.S. Cl.
  CPC ...... *B01D 46/121* (2022.01); *B01D 2265/027* (2013.01); *B01D 2271/02* (2013.01); *B01D 2279/60* (2013.01); *F02C 7/055* (2013.01)

(58) Field of Classification Search
  CPC .......... B01D 2265/027; B01D 2271/02; B01D 2271/022; B01D 2271/025; B01D 2271/027; B01D 2279/60; F02C 7/055
  See application file for complete search history.

(56) References Cited

U.S. PATENT DOCUMENTS

| | | |
|---|---|---|
| 8,105,409 B2 | 1/2012 | Mann et al. |
| 8,425,644 B2 | 4/2013 | Sundvik et al. |
| 8,673,040 B2 | 3/2014 | Handley et al. |
| 8,951,321 B2 | 2/2015 | Gillingham et al. |
| 9,623,356 B2 | 4/2017 | Gorman |
| 10,486,094 B2 | 11/2019 | Katare et al. |
| 2010/0192528 A1* | 8/2010 | Mann ..................... B01D 46/58 55/482 |
| 2010/0229514 A1* | 9/2010 | Ayshford ........... B01D 46/0005 55/482 |
| 2010/0251678 A1* | 10/2010 | Mann ................... B01D 46/121 55/483 |
| 2014/0096493 A1 | 4/2014 | Kelmartin et al. |
| 2018/0221801 A1* | 8/2018 | Eyers ..................... F02C 7/052 |
| 2023/0175717 A1* | 6/2023 | Yadav .................. A01K 1/0082 55/385.1 |

* cited by examiner

A

B

FIG. 13
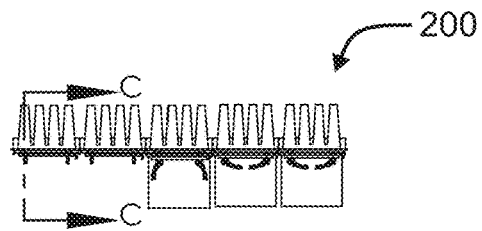
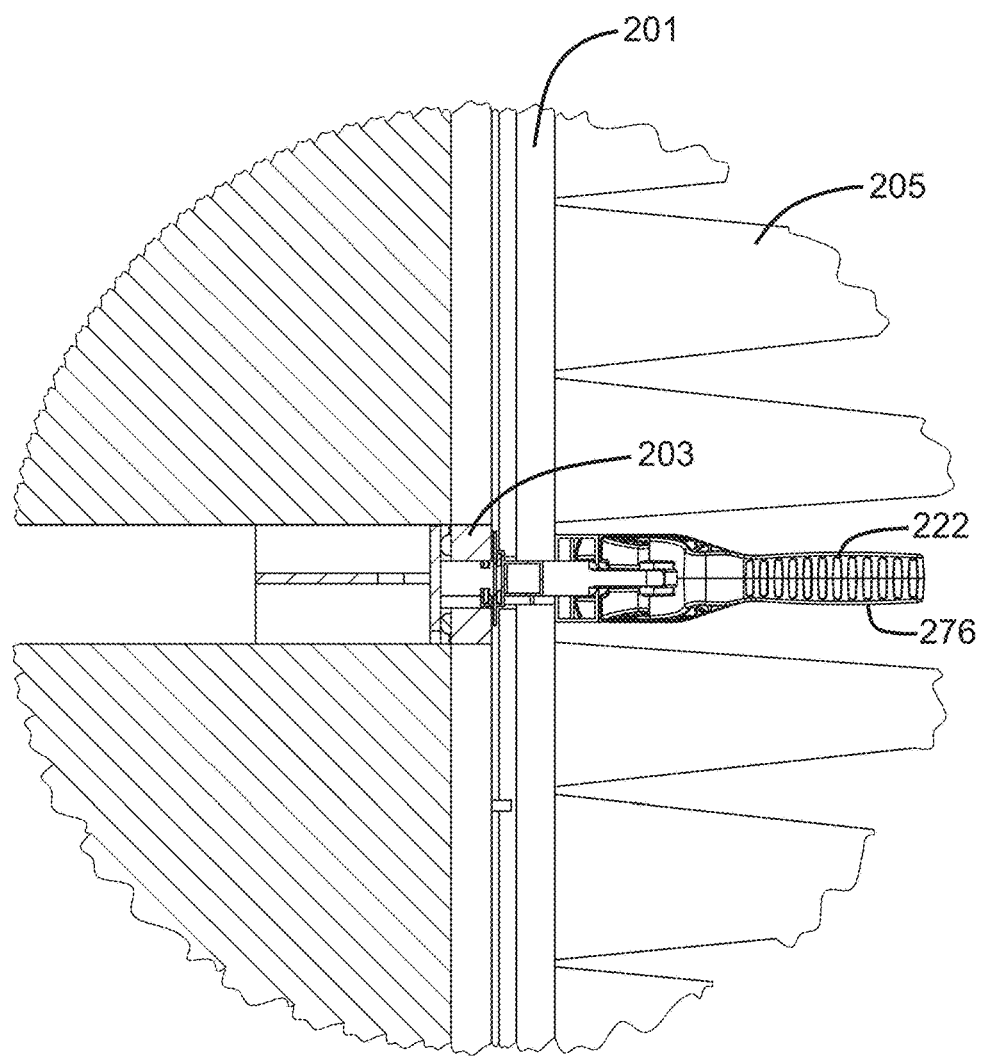
FIG. 14

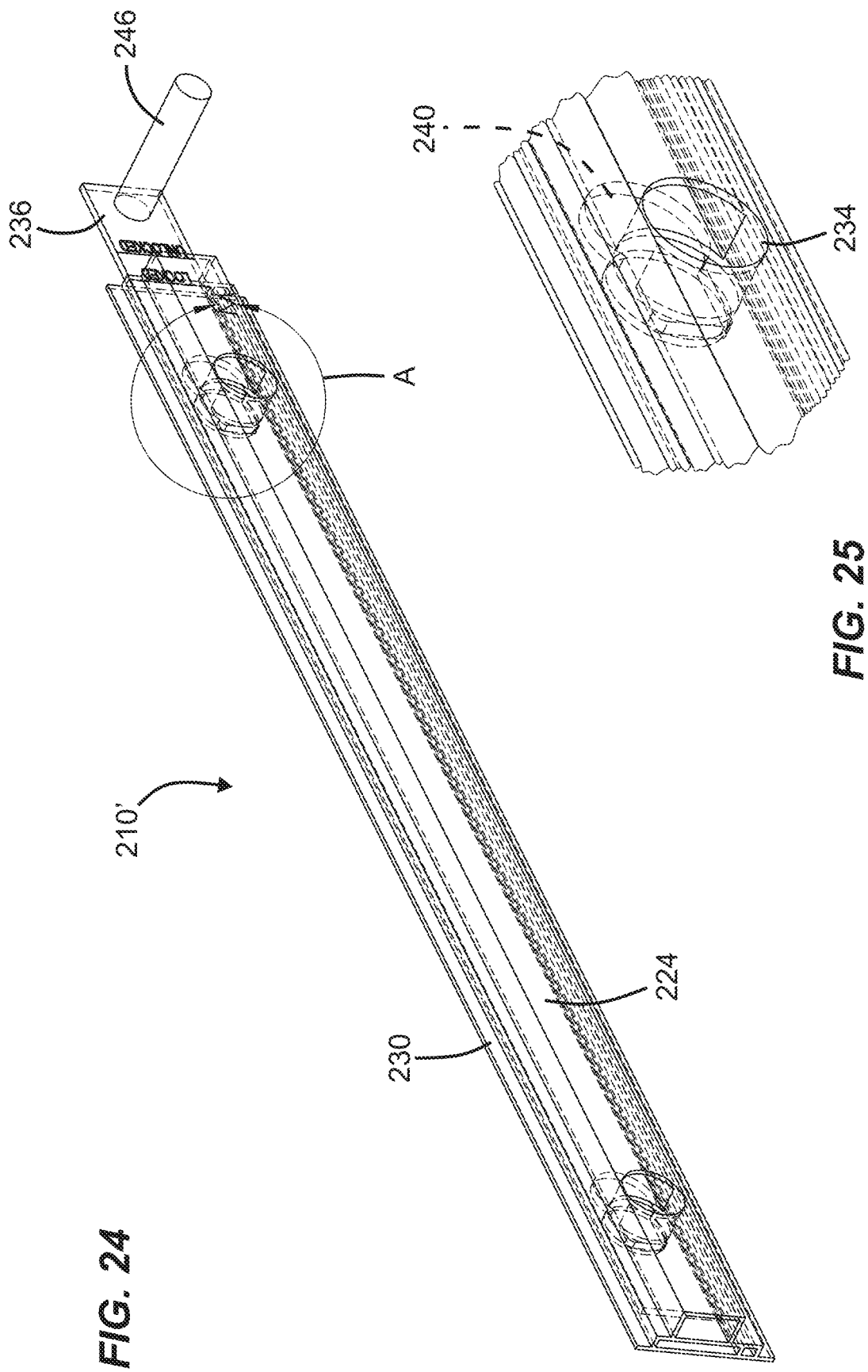

FIG. 28
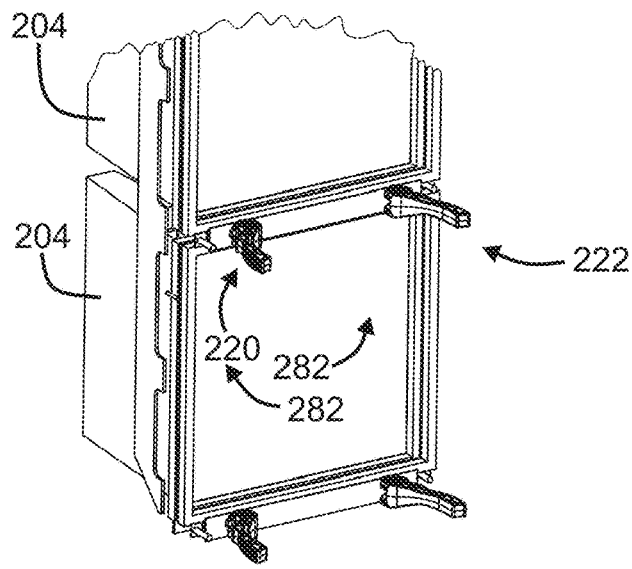
FIG. 29
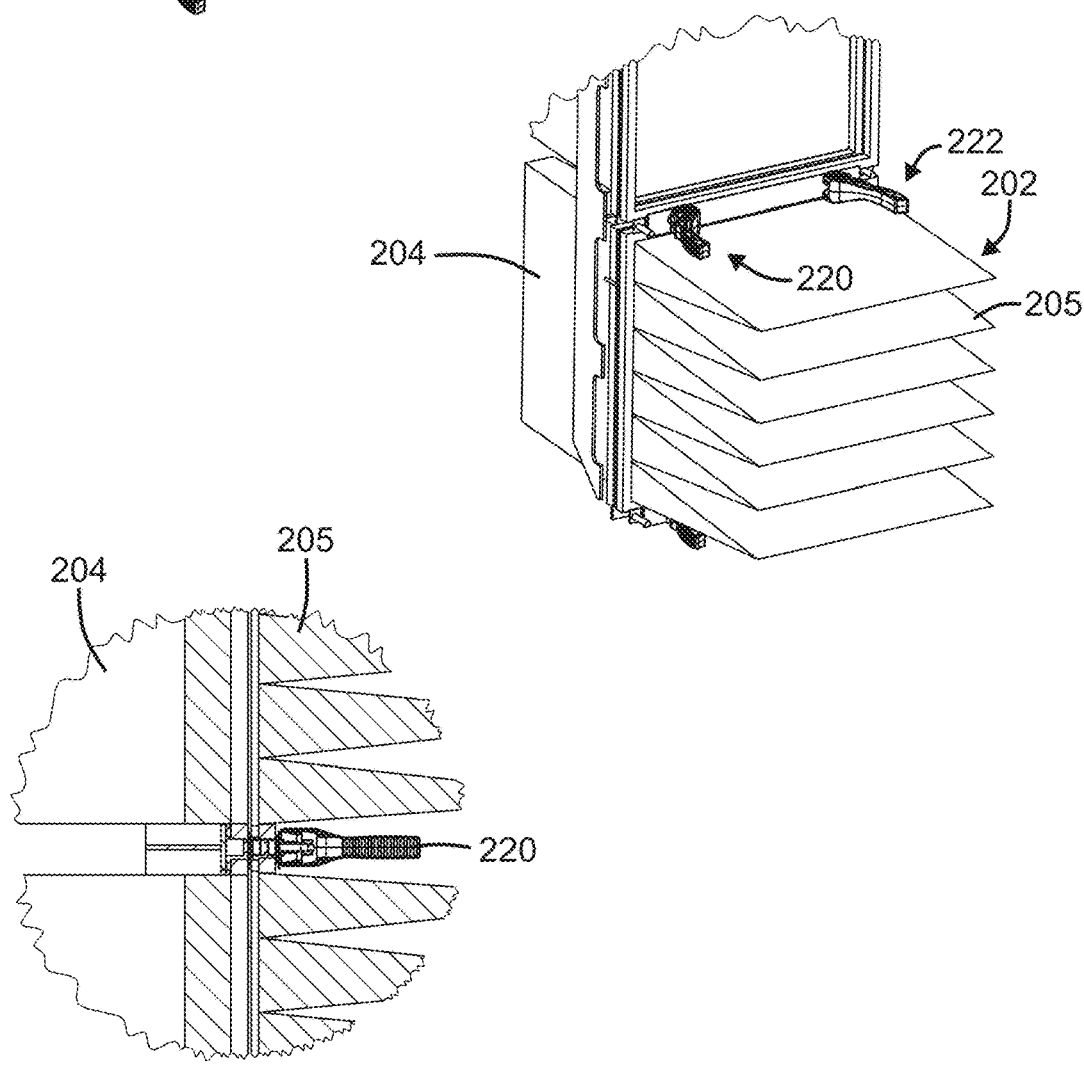
FIG. 30

CLAMP SYSTEM AND FILTER ARRANGEMENT AND METHODS

This application is a National Stage Application of PCT International Patent application No. PCT/US2021/036006, filed Jun. 4, 2021, which claims the benefit of priority to U.S. Provisional patent application Ser. No. 63/035,412, filed Jun. 5, 2020, and U.S. Provisional patent application Ser. No. 63/140,020, filed Jan. 21, 2021, and which applications are incorporated herein by reference. To the extent appropriate, a claim of priority is made to each of the above disclosed applications.

TECHNICAL FIELD

This disclosure relates to air filter systems. In certain applications, it concerns air filters for use in air intake of gas turbine systems and a clamp arrangement. Methods are also provided.

BACKGROUND

Although the present disclosure may be applied in a variety of applications, it was developed for use with gas turbine filter systems. Gas turbine systems are useful in generating electricity. These types of systems are convenient in that they can be constructed quickly and they produce fewer harmful emissions than coal or oil. Gas turbines utilize air for combustion purposes. The combustion air needs to be clean. To ensure clean air for combustion, air filters have been used to clean the air taken into the gas turbine system.

Filters are used to purify the air intake for gas turbines. An example gas turbine air intake system is disclosed in U.S. Pat. No. 8,673,040, incorporated herein by reference.

The air filters used in these intake systems need to be periodically removed and replaced. It is desirable to find a convenient system for allowing for the quick and easy servicing of these air filters. In particular, it is desirable to have a system in which a single clamp system can be used for both the first filter and second filter, and allow the second filter to remain sealed in placed while the first filter is being serviced.

SUMMARY

This disclosure provides a solution to the problem in the prior art. For example, the solution provided herein allows for a single clamp that seals both a first filter and second filter to the support grid of an intake air system of a gas turbine and also allows for keeping the second filter in sealing engagement with the support grid while releasing the first filter for replacement. The clamp can also selectively release the second element for periodic removal and replacement.

In a first aspect, a clamp system for releasably attaching a filter assembly to a support grid is provided; the clamp system includes: (a) an elongated support member with first and second opposite open ends, a first slide channel adjacent the first end; and a second slide channel adjacent the second end; (b) a first clamp slidably mounted in the first open end; (c) a second clamp slidably mounted in the second open end; (d) a first slide pin arrangement slidably mounted in the first slide channel between a locked and a released position; (e) a second slide pin arrangement slidably mounted in the second slide channel between a locked and a released position; (f) an elongated omega clamp removably mounted to cover the support member; the omega clamp having first and second spaced through slots; (i) the first through slot slidably accommodating a portion of the first slide pin arrangement; (ii) the second through slot slidably accommodating a portion of the second slide pin arrangement; (g) first and second pivot rods extending through and connecting the omega clamp and the support member; the first and second pivot rods each having a hinge point in the support member and a pivot axis along a length of the support member between the first and second open ends of the support member; wherein, when the first and second slide pin arrangements are slid to the released position, the omega clamp is free to be pivoted with the first and second pivot rods along the pivot axis away from covering the support member.

The clamp system can further include a separate maintenance tool constructed and arranged to engage each of the first and second pivot rods and apply an axial force against the omega clamp.

The maintenance tool can include (a) a head defining a recess sized to engage the first and second pivot rods, and a cam surface on a portion of the head opposite of the recess; and (b) a grasping handle extending from the head.

Each of the first and second pivot rods includes a barrel nut on a portion of the pivot rods opposite of the hinge point.

Each of the first clamp and second clamp includes: (a) a slide rod sized to be slidably received within one of the first and second open ends of the support member; (b) a post secured to and perpendicular to the slide rod; and (c) a flange secured to a distal portion of the post and parallel to and facing the slide rod to form a gasket holding recess therebetween.

Each of the first and second slide pin arrangements includes: (a) a pin slide rod sized to slide within one of the first and second slide channels; (b) a support secured to and perpendicular to the pin slide rod; (c) a pin flange secured to a distal portion of the support and parallel to the pin slide rod with an interior side facing the pin slide rod and an opposite exterior side; and (d) pin projecting from the exterior side and sized to slide within one of the first and second slots in the omega clamp.

The omega clamp comprises: (a) a base with a pair of legs extending perpendicular to the base; (i) the base defining the first and second through slots: (ii) the base having an exterior side and an opposite interior side; (b) each of the legs being bent at a non-zero angle remote from the base and away from each other; the legs and the interior side of the base defining an open channel; and (c) first and second pin slider keepers secured to the interior side of the base and overlapping a portion of the first and second through slots.

The omega clamp comprises: (a) a base with a pair of legs extending perpendicular to the base; (i) the base defining the first and second through slots; (ii) the base having an exterior side and an opposite interior side; (b) each of the legs being bent at a non-zero angle remote from the base and away from each other; the legs and the interior side of the base defining an open channel; and (c) first and second pin slider keepers secured to the interior side of the base and overlapping a portion of the first and second through slots; (i) the first and second pin slider keepers being sized to slidably receive one of the pin flanges to put the first and second slide pin arrangements in the locked positions; and wherein when the first and second slide pin arrangements are slid to the released position, each of the pin flanges are slid to be free of the first and second pin slider keepers, and the omega clamp is free to be pivoted with the first and second pivot rods along the pivot axis away from covering the support member.

In another aspect, a clamp system for releasably attaching a filter assembly to a support grid is provided comprising: (a) a support member; (b) first and second clamps slidably mounted at opposite ends of the support member; (c) a first and second slide pin arrangements slidably mounted a portion of the support member; (d) an omega clamp removably mounted to cover the support member and slidably accommodating a portion of the first and second slide pin arrangement; (e) first and second pivot rods extending through and connecting the omega clamp and the support member; the first and second pivot rods each having a hinge point in the support member and a pivot axis along a length of the support member between opposite ends of the support member; and wherein, when the first and second slide pin arrangements are slid to a released position, the omega clamp is free to be pivoted with the first and second pivot rods along the pivot axis away from covering the support member.

In another aspect, a filter system is provided comprising: (a) a support grid having a frame with opposite first and second sides; (b) a first filter element oriented along the first side of the support grid; (c) a second filter oriented on the support grid directly across and opposing the first filter; and (d) a single clamp system releasably securing both the first filter element and the second filter element to the frame.

The clamp system comprises: (a) a support member; (b) first and second clamps slidably mounted at opposite ends of the support member; (c) a first and second slide pin arrangements slidably mounted a portion of the support member; (d) an omega clamp removably mounted to cover the support member and slidably accommodating a portion of the first and second slide pin arrangement; (e) first and second pivot rods extending through and connecting the omega clamp and the support member; the first and second pivot rods each having a hinge point in the support member and a pivot axis along a length of the support member between opposite ends of the support member; and wherein, when the first and second slide pin arrangements are slid to a released position, the omega clamp is free to be pivoted with the first and second pivot rods along the pivot axis away from covering the support member.

The clamp system includes: (a) an elongated support member with first and second opposite open ends, a first slide channel adjacent the first end; and a second slide channel adjacent the second end; (b) a first clamp slidably mounted in the first open end; (c) a second clamp slidably mounted in the second open end; (d) a first slide pin arrangement slidably mounted in the first slide channel between a locked and a released position; (e) a second slide pin arrangement slidably mounted in the second slide channel between a locked and a released position; (f) an elongated omega clamp removably mounted to cover the support member; the omega clamp having first and second spaced through slots; (i) the first through slot slidably accommodating a portion of the first slide pin arrangement; (ii) the second through slot slidably accommodating a portion of the second slide pin arrangement; (g) first and second pivot rods extending through and connecting the omega clamp and the support member; the first and second pivot rods each having a hinge point in the support member and a pivot axis along a length of the support member between the first and second open ends of the support member; wherein, when the first and second slide pin arrangements are slid to the released position, the omega clamp is free to be pivoted with the first and second pivot rods along the pivot axis away from covering the support member.

The filter system can include (a) the first filter includes a perimeter frame with a gasket thereon; (b) the second filter includes a perimeter frame with a gasket thereon; and (c) a seal is formed with the first filter perimeter gasket being between and against the first and second clamps and the perimeter frame of the second filter.

A seal is formed with the second filter perimeter gasket being between and against the omega clamp and the support grid frame.

In one example, the first filter comprises a pocket filter; and the second filter comprises a pocket filter.

In another aspect, a method of servicing a filter arrangement in a gas turbine air inlet system is provided; the system having a support grid having a frame with opposite first and second sides; a first filter element releasably sealed to the first side of the support grid; and a second filter releasably sealed to the first side of the support grid directly across and opposing the first filter; the method comprising: (a) releasing a single clamp holding both of the first filter element and second filter element in place in sealing engagement on the support grid; (b) while the second filter element remains in sealing engagement on the support grid, removing the first filter element; and (c) providing a replacement first filter element and engaging the single clamp to seal the replacement first filter element to the support grid.

The method can further comprise: (a) before the step of providing a replacement first filter element, releasing another part of the single clamp to remove the second filter element; and (b) providing a replacement second filter element and engaging the single clamp to seal the replacement second filter element to the support grid.

The method can further include using the single clamp as variously characterized above.

In another aspect, a clamp system for releasably attaching a filter assembly to a support grid is provided. The clamp system comprising a plurality of clamp rods; a first elongated support member with openings, each opening being sized to fit over one of the clamp rods; a first slide plate slidably mounted in the first support member; the first slide plate having openings alignable with the openings in the first support member; the first slide plate having an end handle; a second elongated support member with openings, each opening in the second support member sized to fit over one of the clamp rods; and a plurality of handgrips, each handgrip constructed and arranged to engage one of the clamp rods and apply an axial force against the second support member.

The clamp system can further include a second slide plate slidably mounted in the second support member; the second slide plate having openings alignable with the openings in the second support member; and the second slide plate having an end handle.

In many examples, the handgrips each comprises: a head defining a recess sized to engage one of the clamp rods, and a cam surface on a portion of the head opposite of the recess; and a grasping handle extending from the head.

The first support member may have a rectangular cross-sectional wall with opposite open ends, and the openings in the first support member extend through opposing sides of the wall; and the second support member may have a rectangular cross-sectional wall with opposite open ends, and the openings in the second support member extend through opposing sides of the wall of the second support member.

In one or more examples, the first slide plate openings have a narrowed region and a wider region.

In example embodiments, the second slide plate openings have a narrowed region and a wider region.

There can be two clamp rods and two handgrips.

In another aspect, a filter system is provided comprising: a support grid having a frame with opposite upstream and downstream sides; a first filter element oriented along the upstream side of the support grid; a second filter element oriented on the support grid on the downstream side directly across and opposing the first filter element; and a single clamp system releasably securing both the first filter element and the second filter element to the frame.

The second filter element may have a second element gasket pressed against the upstream side of the support grid; and the first filter element may have a first element gasket pressed against the clamp system.

In example embodiments, the clamp system comprises: one or more clamp rods extending from the support grid; a first elongated support member holding a first slide plate and positioned over the clamp rods; the first support member being positioned against the second element gasket; a second elongated support member positioned over the clamp rods and against the first element gasket, such that the first element gasket is positioned between and against the first support member and second support member; and one or more handgrips removably secured to the clamp rods and applying an axial force against the second support member.

Many embodiments further comprise a second slide plate being held by the second support member and positioned over the clamp rods.

In examples, there are a plurality of first filter elements on the upstream side of the support grid; and the first filter elements comprise pocket filter elements or V-bank elements.

In examples, there are a plurality of second filter elements on the downstream side of the support grid, and the second filter elements comprise V-bank filter elements.

In another aspect, a method of servicing a filter arrangement in a gas turbine air inlet system is provided; the system having a support grid having a frame with opposite upstream and downstream sides; a first filter element releasably sealed to the upstream side of the support grid; and a second filter element releasably sealed to the upstream side of the support grid directly across and opposing the first filter element; the method comprising: releasing a single clamp assembly holding both of the first filter element and second filter element in place in sealing engagement on the support grid; while the second filter element remains in sealing engagement on the support grid, removing the first filter element; and providing a replacement first filter element and engaging the single clamp assembly to seal the replacement first filter element to the support grid.

The method may further comprise, before the step of providing a replacement first filter element, releasing another part of the single clamp assembly to remove the second filter element; and providing a replacement second filter element and engaging the single clamp assembly to seal the replacement second filter element to the support grid.

In one or more example methods, the step of engaging the single clamp assembly to seal the replacement first filter element to the support grid includes grasping a handgrip and rotating the handgrip from an open position to a closed position to apply an axial force against the clamp assembly.

The step of engaging the single clamp assembly can include, after rotating the handgrip to apply an axial force against the clamp assembly, moving a first slide plate to lock the second filter element into a sealed position against the support grid.

The method can further include, after the step of moving a first slide plate to lock the second filter element into a sealed position against the support grid, moving a second slide plate to lock the first filter element into a sealed position; and rotating the handgrip back to the open position and removing the handgrip.

The method can include the single clamp assembly as variously characterized above.

A variety of examples of desirable features or methods are set forth in the description that follows.

BRIEF DESCRIPTION OF THE DRAWINGS

FIG. 13 is a top plan view of the system of FIG. 9;

FIG. 14 is a cross-sectional view of a portion shown at cross section C-C of FIG. 13:

FIG. 24 is a perspective view of the clamp assembly used for the air inlet system of FIGS. 22 and 23;

FIG. 25 is an enlarged view of section A of FIG. 24;

FIG. 28 is a perspective view of the air inlet system during one step of applying the clamp system of FIGS. 24-27;

FIG. 29 is a perspective view showing another step of applying the clamp system of FIGS. 24-27;

FIG. 30 is a cross-sectional view of a portion of the clamp system shown in FIG. 29;

DETAILED DESCRIPTION

Figure 1:
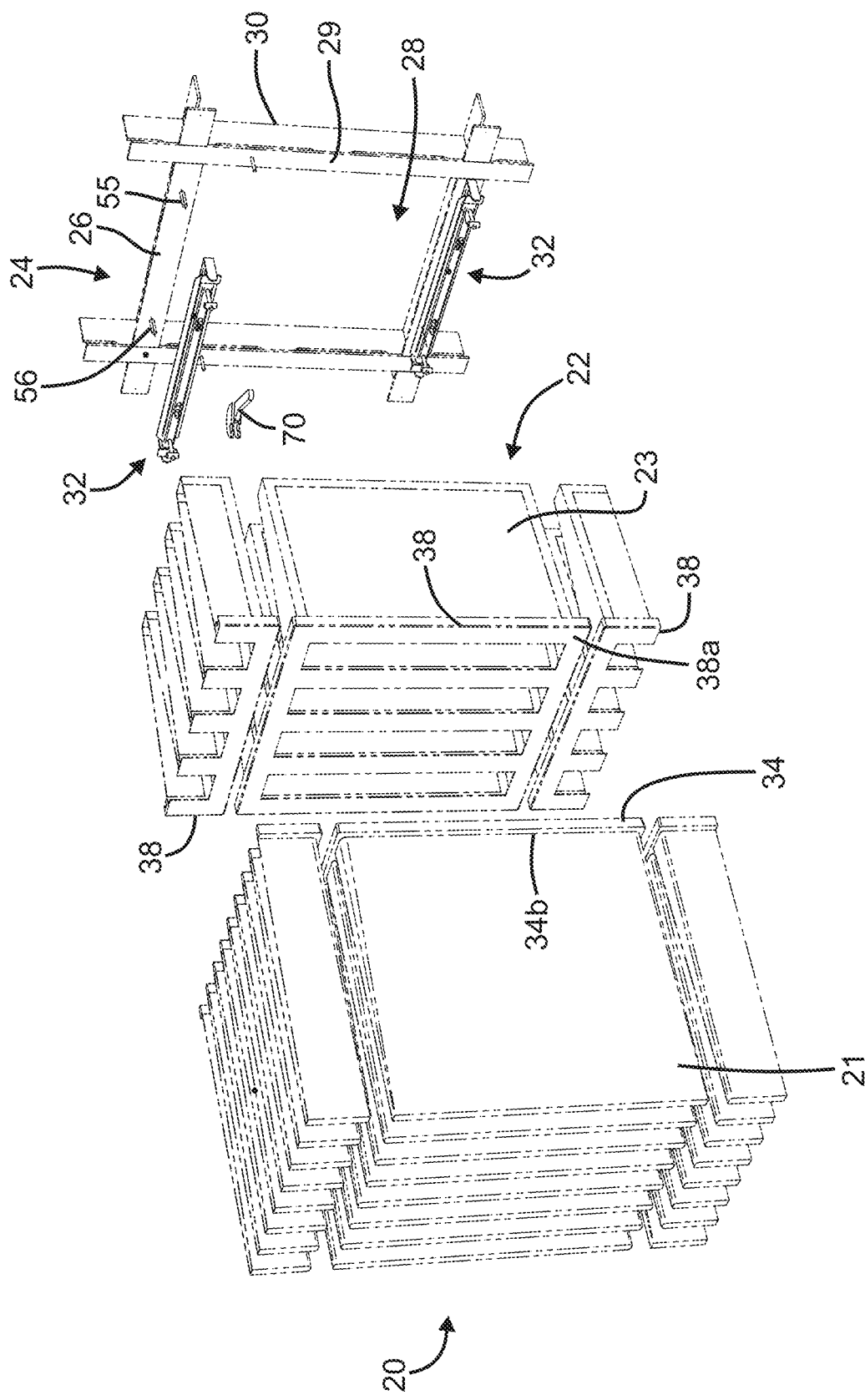
FIG. 1 is a perspective, exploded view of a filter system for use with a gas turbine air system, the FIG. depicting a first filter element, a second filter element, a portion of the gas turbine support grid, and a clamp system.
Figure 2:
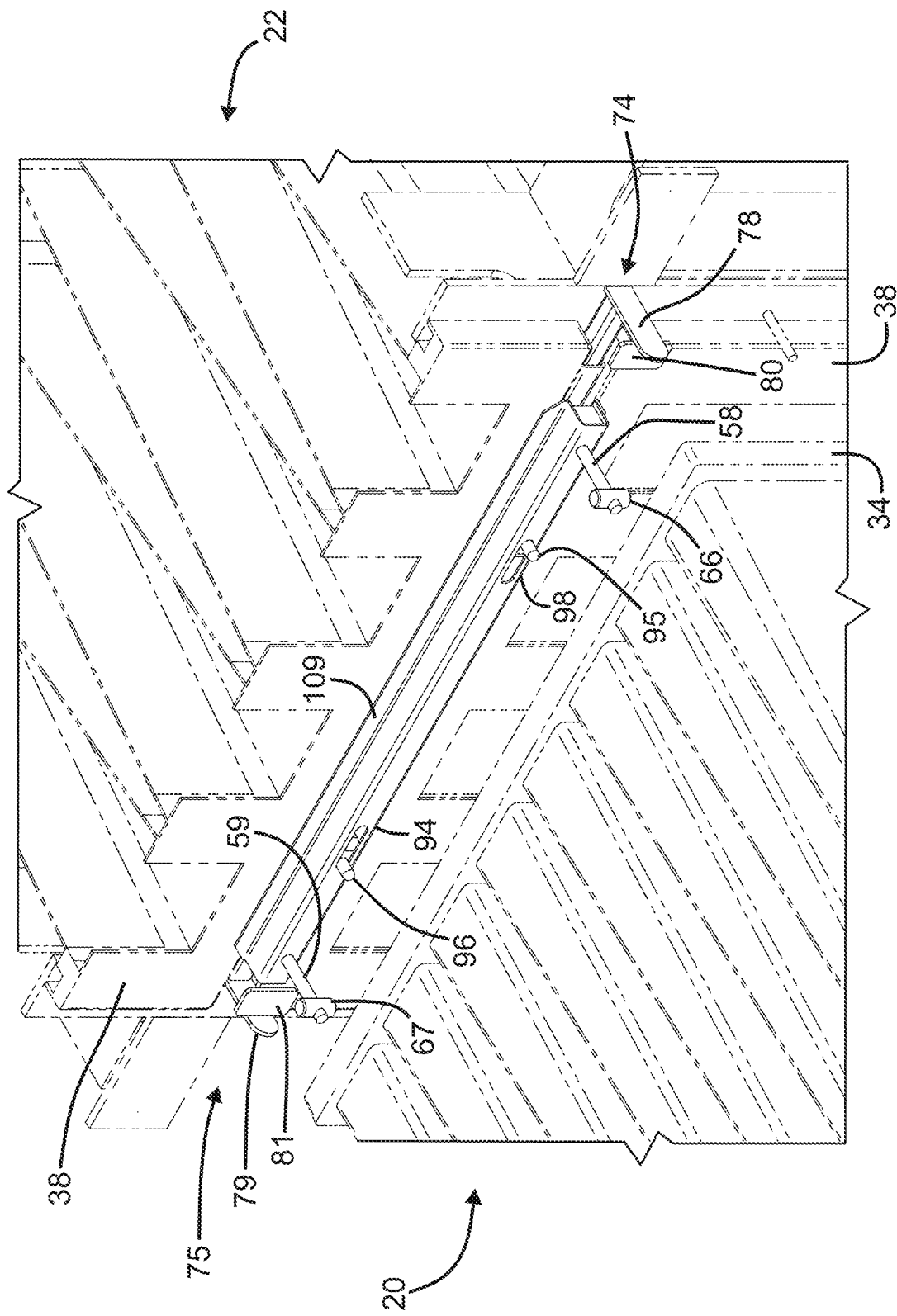
FIG. 2 is a perspective view of the system of FIG. 1, with the second filter element secured in place, and the first filter element being removed from the support grid.

FIG. 1 shows a portion of a gas turbine air inlet system having a first filter element 20 and a second filter element 22. FIG. 1 also shows a portion of a first filter element 20 both vertically above and below the first element 20 shown in its entirety. Similarly, the second filter element 22 also shows a portion of another second element 22 both vertically above and vertically below it.

A variety of different types of filter elements can be used. In this particular example, the first filter element 20 is a pocket filter element, such as shown and described in U.S. Pat. No. 7,931,723, incorporated herein by reference. The second filter element 22 can also be a pocket filter, although a number of different variations are possible. Each of the elements 20, 22 has filter media 21, 23, respectively. The first filter element 20 could also be a v-bank filter.

In FIG. 1, a portion of a support grid 24 having a frame 26 is shown. The support grid 24 will include a matrix of several, for example hundreds, of rectangular grids with openings 28. Each opening 28 accommodates one of the second filters 22 and one of the first filters 20. In this example, the support grid 26 has opposite first and second sides 29, 30. The first side 29 is generally an upstream side, while the side 30 is a downstream side. When installed, the first filter element 20 and the second filter element 22 will be oriented on the support grid 24 in opposition to each other, such that the first filter element 20 is on the upstream side 24, while the second filter element 22 is on the downstream side 30.

The Example Embodiment of the Clamp System of FIGS. 1-8

Also visible in FIG. 1 is a clamp system 32. The clamp system 32 is shown at an upper portion of FIG. 1 as being exploded from the support grid 24, while the clamp system 32 at a lower portion of the FIG. is shown secured to the support grid 24. The clamp system 32 is a single clamp system that releasably secures the both the first filter element 20 and the second filter element 22 to the frame 26 of the support grid 24.

Figure 7:
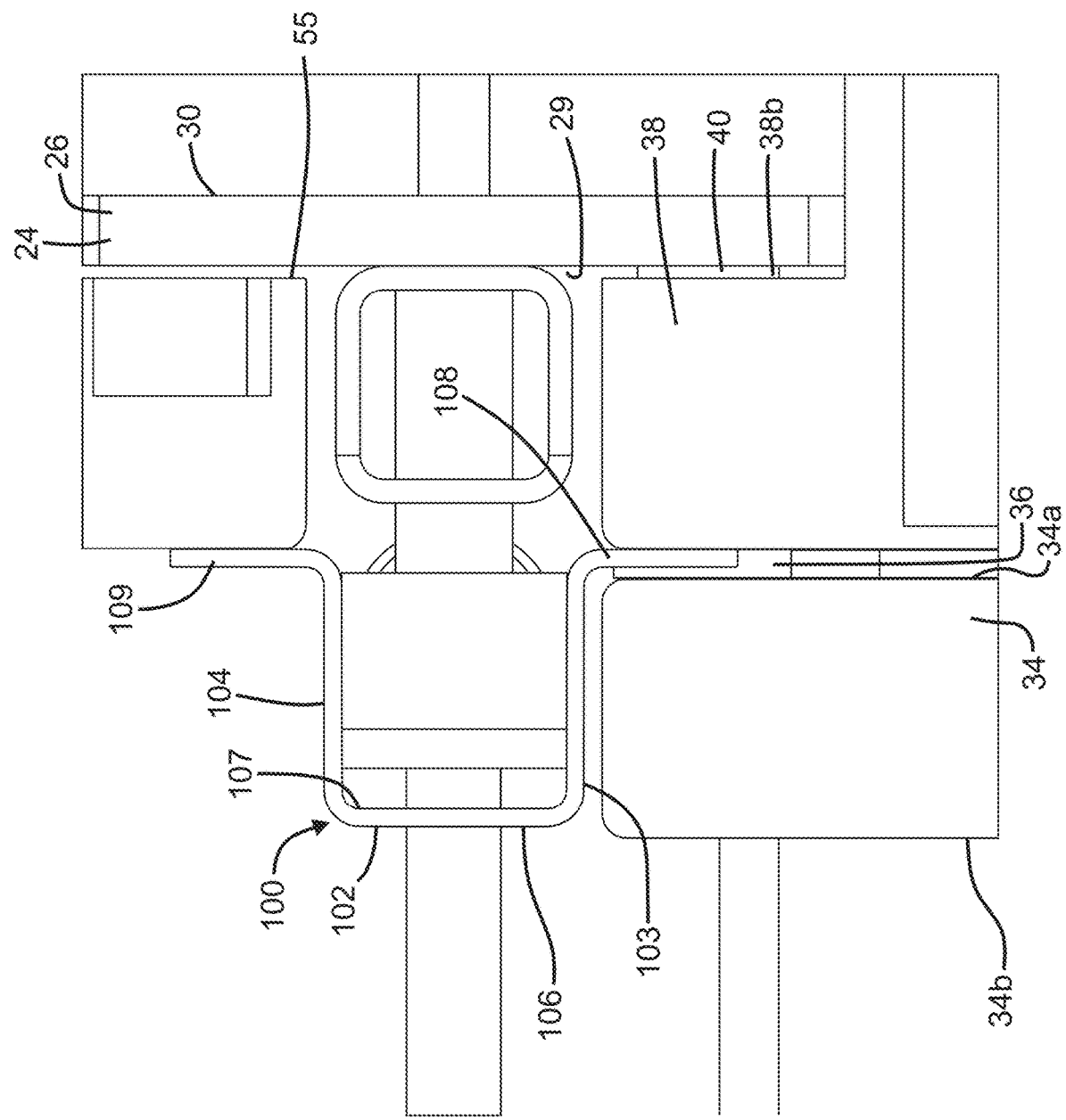
FIG. 7 is an enlarged view showing a cross-section of both the first filter element and second filter element in sealing engagement against the support grid of the gas turbine air inlet system.
Figure 8:
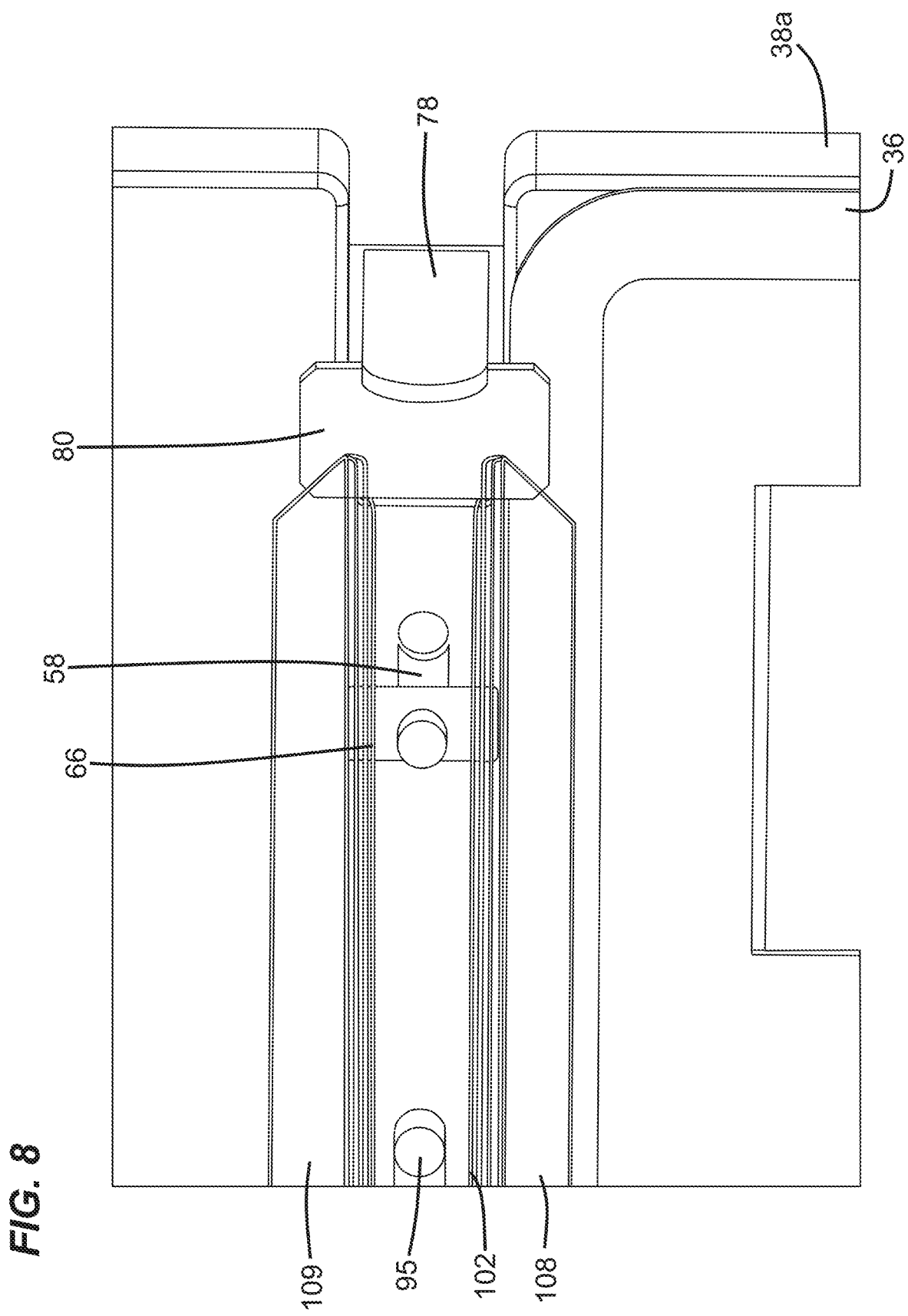
FIG. 8 is a schematic, perspective view showing the gasket of the first filter element, with the remaining part of the first filter element hidden to enhance clarity, and how it is held in place by the clamp system.

The first filter element 20 includes a perimeter frame 34 all along each side of the first element 20. The perimeter frame includes a first side 34a (FIG. 7) facing away from the filter media 21 and an opposite second side 34b facing toward the filter media 21. Secured to the perimeter frame 34 on the first side 34a is a gasket 36 (FIGS. 7 and 8). Gasket 36 is secured to the frame 34 on the first side 34a facing away from the filter media 21 and is along the entire perimeter of the first element 20. The gasket 36 can be made from a variety of materials, including a soft foam.

The second element 22 includes a perimeter frame 38 as can be seen in FIG. 1 the perimeter frame 38 is along the entire perimeter of the second element 22. The perimeter frame 38 includes a first side 38a facing away from the filter media 23, and an opposite second side 38b (FIG. 7) facing toward the filter media 23. Secured to the perimeter frame 38 of the second element 22 is a gasket 40. The gasket 40 is not on the side 38a that is visible in FIG. 1 but can be seen in the cross-section in FIG. 7 at 38b. The gasket 40 is on a portion of the frame 38 that faces a remaining part of the second element 22. As can be appreciated from reviewing FIG. 1 and FIG. 7, the gasket 40 for the second filter element 22 is compressed against the first or upstream side 29 of the frame 26 of the support grid 24. The gasket 36 of the first filter element 20 is then pressed against the frame 38 (first side 38a of the frame 38) of the second element 22. The clamp 32 holds the first filter element 20 and second filter element 22 in place in sealing engagement against the support grid 24.

In general, in operation of the gas turbine air inlet system, air to be filtered enters the first filter element 20, in which particulate and debris are removed by passing through the filter media 21. The filtered air then flows through the second element 22 by flowing from inside of the second element 22 through the media 23 to the outside on the downstream side, and then proceeds to the gas turbine. In this arrangement, the first filter element 20 is located generally on an upstream side of the support grid 24, while the second element 22 is primarily located on the downstream side of the support grid 24, although the seal made with the gasket 40 of the second element 22 is along the first or upstream side 29 of the support grid 24.

Figure 4:
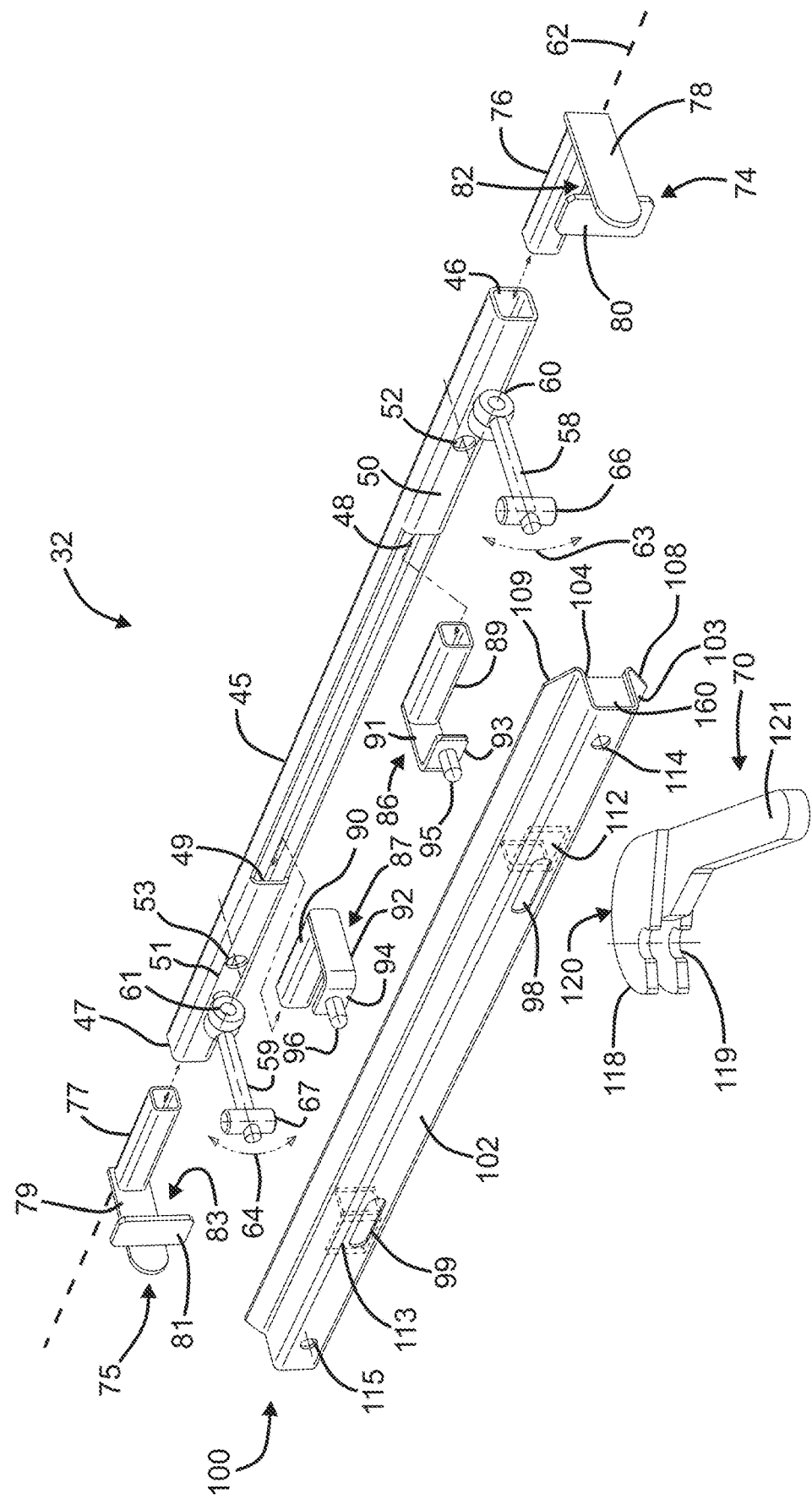
FIG. 4 is an exploded, perspective view of the clamp system used in FIGS. 1-3.

In reference now to FIG. 4, an example clamp system 32 is illustrated in an exploded view.

The clamp system 32 is used for releasably attaching the filter assembly, comprising the first element 20 and the second element 22 to the support grid 24. The clamp system 32 allows for using the single system 32 to hold both the first filter element 20 and the second filter element 22 in place in sealing engagement on the support grid 24. While the second filter element 22 remains in sealing engagement on the support grid 24, the clamp system 32 can be released to allow for removal and replacement of the first filter element 20. The clamp system 32 also allows for periodic removal and replacement of second element 22. Typically, the first filter elements 20 need removal and replacement at more frequent intervals than the second elements 22.

The clamp system 32 includes an elongated support member or tube 45. The support tube 45 has first and second opposite open ends 46, 47. The support tube 45 also includes a first slide channel 48 adjacent to the first end 46, and a second slide channel 49 adjacent the second end 47. The first and second slide channels 48, 49 are formed by openings in the tube 45 spaced from the ends 46, 47. As can be seen, there is a first enclosure 50 and a second enclosure 51, such that the region between the ends of the enclosure 50, 51 and the open ends 46, 47 is an enclosed open through channel.

The tube 45 further includes a through hole 52 through the enclosure 50 and a remaining portion of the tube 45 and a through hole 53 through the enclosure 51 and a remaining portion of the tube 45. The through holes 52, 53 receive projections or pegs 55, 56 (FIG. 1) extending from the frame 26 of the support grid 24. This allows for mounting of the tube 45 on and against the frame 26 of the grid 24.

The clamp system 32 further includes first and second pivot rods 58, 59. The first and second pivot rods 58, 59 each has a swivel type hinge point 60, 61 held within the support tube 45 within a respective one of the enclosures 50, 51. The first and second pivot rods 58, 59 pivot along a pivot axis 62 which is along a length of the support tube 45 between the first and second open ends 46, 47. Arrows 63, 64 show in general the direction of pivoting of the rods 58, 59 about their hinge points 60, 61. The purpose for this pivoting is described further below.

In addition, in FIG. 4, each of the first and second pivot rods 58, 59 includes a barrel nut 66, 67 on a portion of the pivot rod 58, 59 that is remote from or opposite of the hinge points 60, 61. The barrel nuts 66, 67 allow for engagement with a maintenance tool 70, described further below.

The clamp system 32 further includes a first clamp 74 slidably mounted in the first open end 46 and a second clamp 75 slidably mounted in the second open end 47. Each of the first clamp 74 and second clamp 75 includes a slide rod 76, 77 sized to slide within one of the first and second open ends 46, 47 of the support tube 45. An extension or post 78, 79 is secured to and perpendicular to the respective slide rod 76, 77. A flange 80, 81 is secured to a distal portion of the respective post 78, 79 and is parallel to and facing the slide rod 76, 77 to form a gasket holding recess 82, 83 therebetween. The first clamp and second clamp 74, 75 releasably hold the first filter elements 20 in place in sealing engagement.

The clamp system 32 further includes a first slide pin arrangement and a second slide pin arrangement 86, 87. The first slide pin arrangement 86 is slidably mounted in the first slide channel 48 between a locked and a released position. The second slide pin arrangement 87 is slidably mounted in the second slide channel 49 between a locked and released position. In the locked position, the second filter element 22 is secured in place against the grid 24. In the unlocked position, the second filter element 22 can be removed from the grid 24 for servicing (replacement). This is described further below.

Each of the first and second slide pin arrangements 86, 87 includes a pin slide rod 89, 90 sized to slide within a respective one of the first and second slide channels 48, 49. The slide channels 48, 49 are within the enclosures 50, 51. Each of the first and second slide pin arrangements 86, 87 further includes a respective support 91, 92 secured to and perpendicular to the pin slide rod 89, 90.

A pin flange 93, 94 is secured to a distal portion of the respective support 91, 92 and parallel to the pin slide rod 89, 90 with an interior side of the pin flange 93, 94 facing the respective pin slide rod 89, 90. The pin flange 93, 94 also has an opposite exterior side. Each of the first and second slide pin arrangements 86, 87 further includes a pin 95, 96. The pins 95, 96 project from the exterior side of the pin flange 93, 94 and is sized to slide within first and second slots 98, 99 of an omega clamp 100.

The clamp system 32 includes elongated omega clamp 100. The omega clamp 100 is removably mounted to cover the support tube 45. The omega clamp 100 includes a base 102 with a pair of legs 103, 104 extending perpendicular to the base 102. The base 102 defines the first and second through slots 98, 99, which accommodate the pins 95, 96. As can be seen in FIG. 4, the slots 98, 99 are spaced from the opposite ends of the omega clamp 100 and also spaced from each other.

The base 102 had an exterior side 106 (FIG. 7) and an opposite interior side 107 (FIG. 7). Each of the legs 103, 104 is bent at a non-zero angle remote from the base 102 and away from each other to form pressing flanges 108, 109. The non-zero angles can include a range of, for example, 30-90° of the pressing flanges 108, 108 from the portion of the legs 103, 104 that are perpendicular to the base 102, but many embodiments are possible. The legs 103, 104 and the interior side 107 of the base 102 define an open channel 110.

The omega clamp 100 further includes first and second pin slider keepers 112, 113. In FIG. 4, the pin slider keepers 112, 113 are shown in broken lines, as they are on the interior side 107 of the base 102. The slider keepers 112, 113 overlap a portion of the first and second through slots 98, 99.

The first and second pin slider keepers 112, 113 are sized to slidably receive a respective one of the pin flanges 93, 94 to put the first and second slide pin arrangements 86, 87 in the locked positions. When the first and second slide pin arrangements 86, 87 are slid to the released position, the omega clamp 100 is free to be pivoted with the first and second pivot rods 58, 59 along the pivot axis 62 and away from covering the support tube 45. That is, when the first and second pin slide arrangements 86, 87 are slid to the released position, each of the pin flanges 93, 94 is slid to be free of the first and second pin slider keepers 112, 113, and the omega clamp 100 is free to be pivoted along the pivot axis 62 in the direction of arrow 63, 64.

When assembled, the first and second pivot rods 58, 59 extend through and connect the omega clamp 100 and the support tube 45. The base 102 of the omega clamp 100 includes through holes 114, 115, which accommodate the pivot rods 58, 59.

Still in reference to FIG. 4, the clamp system 32 includes a separate maintenance tool 70. The maintenance tool 70 is constructed and arranged to engage each of the first and second pivot rods 58, 59 and apply an axial force against the omega clamp 100 during servicing of the second filter elements 22.

The maintenance tool 70 includes a head 118 defining a recess 119 sized to engage the first and second pivot rods 58, 59. The head 118 includes a cam surface 120 on a portion of the head 118 opposite of the recess 119. The maintenance tool 70 also includes a grasping handle 121 sized to be gripped by a human hand. The grasping handle 121 extends from the head 118.

Figure 5:
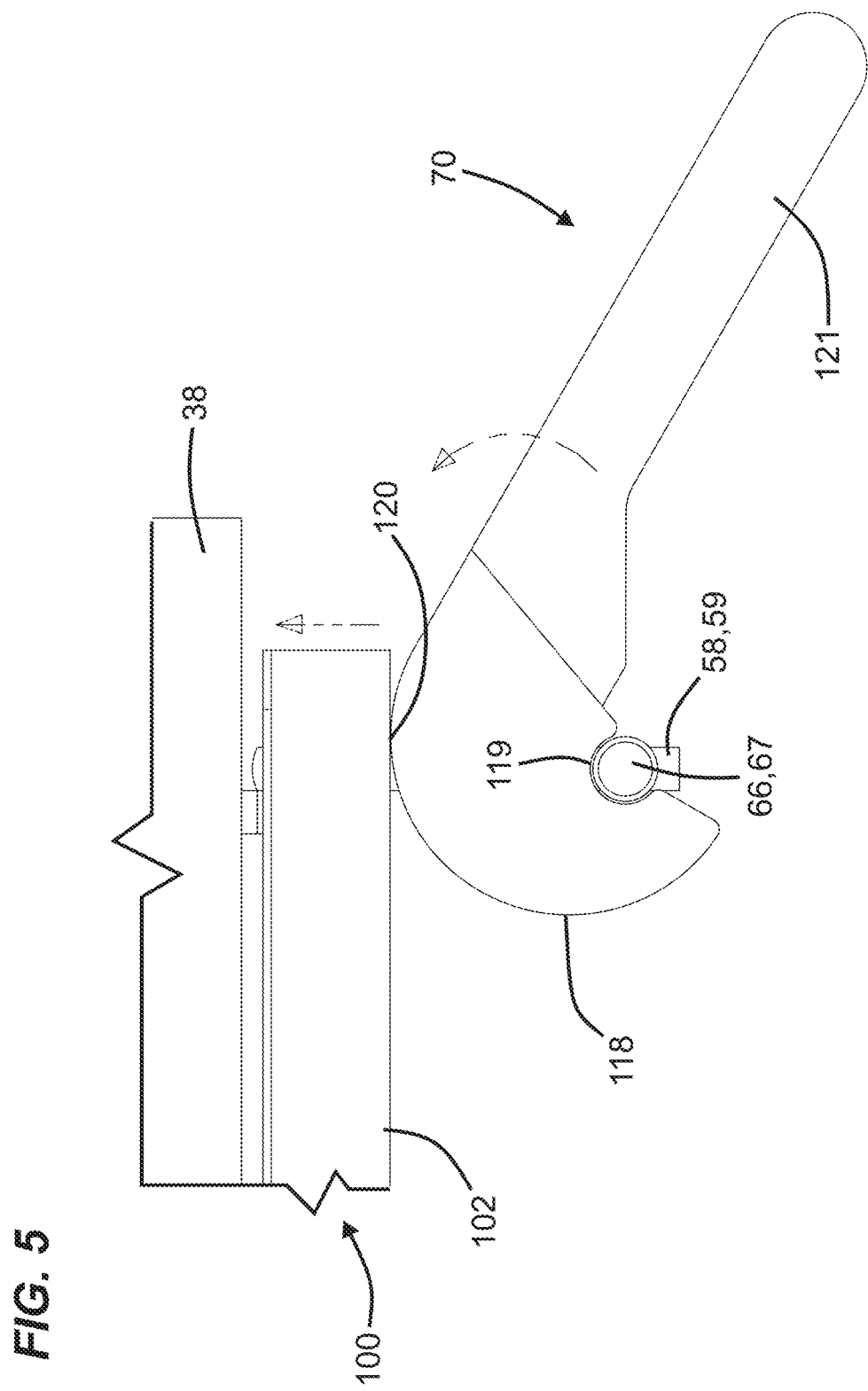
FIG. 5 is an enlarged front view of a portion of the clamp system during one step of servicing the second filter elements.

As can be seen in FIG. 5, the maintenance tool 70 can be used so that the recess 119 is placed on the barrel nut 66, 67 of a respective one of the pivot rods 58, 59. The maintenance tool 70 is then rotated or pivoted about the barrel nut 66, 67, and this moves the camming surface 120 against the omega clamp 100. Specifically, the camming surface 120 can be moved to provide a force against the base 102 of the omega clamp 100. This then applies pressure to the frame 38 of the second element 22 to press against the gasket 40 of the second element 22.

Figure 3:
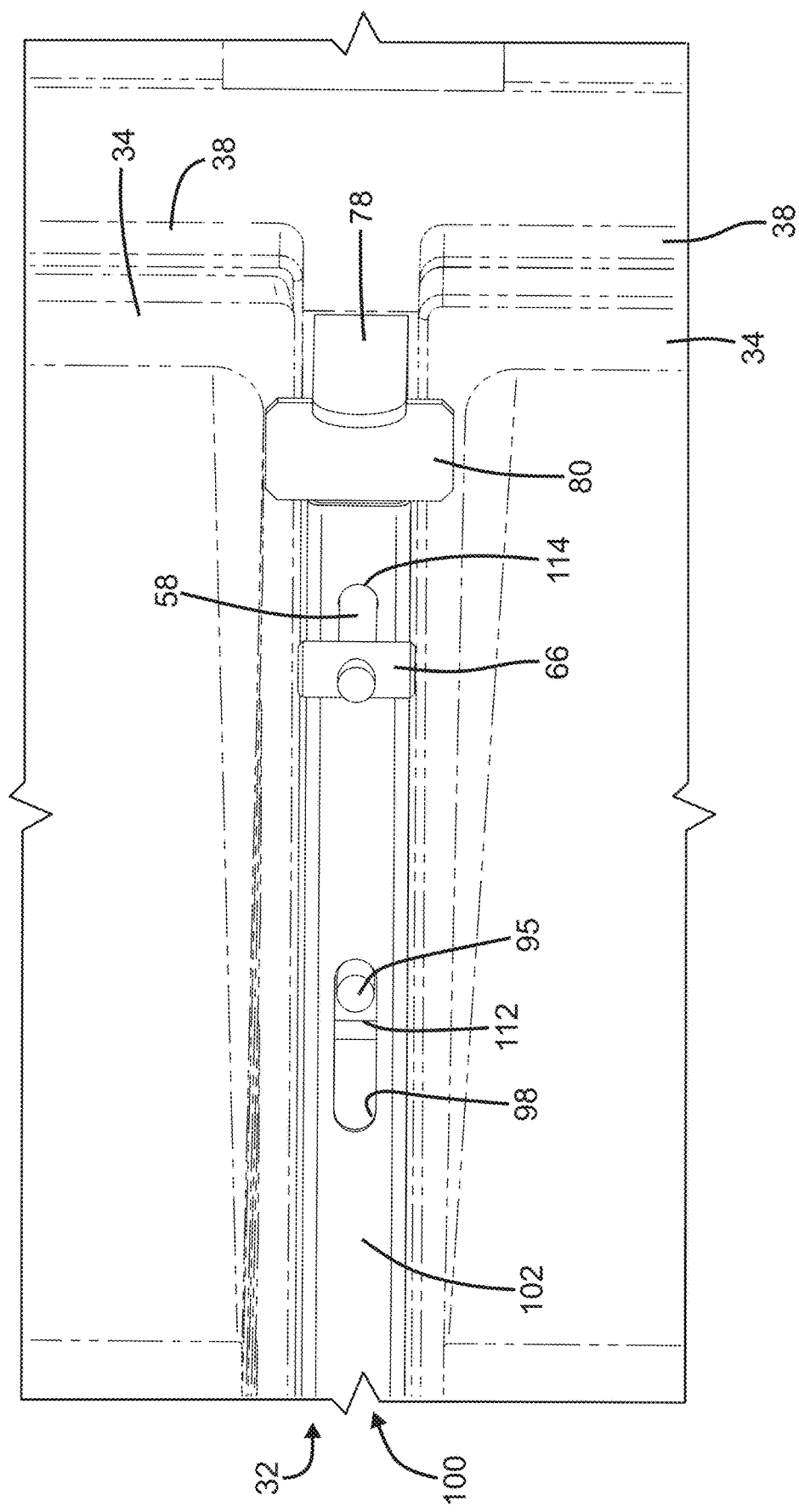
FIG. 3 is a perspective view of a portion of the system of FIG. 1 with both the first filter element and second element in place against the support grid and the clamp system engaged securing both the first filter element and second filter element.

FIG. 3 shows a portion of the system when the first element 20 and second element 22 are in place, and the clamp system 32 is engaged securing both elements 20, 22 in place. The pin 95 of the first slide pin arrangement 86 can be seen in a locked position, in which it is in the position to the most outside portion of the first slide 98. It is being held by the first slider keeper 112. The first pivot rod 58 can be seen extending through the hole 114 in the omega clamp 100. The flange 80 of the first clamp 74 can be seen pressing against the frame 34 of the first filter element 20.

An example method of servicing the filter arrangement is now explained. In reference to FIG. 2, the first step is to slide the first and second clamps 74, 75 in an outward direction from the rest of the assembly, such that they are slid away from each other and toward the outside. This can be seen in FIG. 2, in which the clamps 74, 75 have been slid away so that the flanges 80, 81 are away from what would be the frame 34 of the first filter element 20. This step allows the second filter element 22 to remain in sealing engagement on the support grid 24, but releases the first element 20 so that it can be removed. A new, replacement first element 20 can be provided. The new first element 20 is placed so that the perimeter frame 34 of the first element 20 holding the gasket 36 can be placed against the first side of the perimeter frame 38a. The replacement filter element 20 can be axially pressed against the frame 38a of the second element 22, and then the first and second clamps 74, 75 can again be slid inwardly toward each other so that the flanges 80, 81 are resting against the perimeter frame 34 on the second side 34b of the perimeter frame 34 that is opposite from the first side 34a on which the gasket 36 is located. The flanges 80, 81 help to hold the first element 20 in place, with a seal formed against the frame 38 (second side 38b) of the second element 22. See FIG. 7.

From time to time, it will also be desirable to service and replace the second elements 22. During this maintenance step, the gas turbine inlet system is shut down. First, the first filter element 20 is removed, by the steps above. That is, the first and second clamps 74, 75 are moved away from each other to the outside, which allows for release and removal of the first element 20. Next, the maintenance tool 70 is used to press the omega clamp 100 against the perimeter frame 38 of the second element 22 and compress the gasket 40 of the second element 22 to a maximum displacement. The maintenance tool 70 is used by placing the recess 119 against the barrel nut 66, 67 and pivoting the maintenance tool 70 so that the cam surface 120 presses against the base 102 of the omega clamp 100.

Next, the pins 95, 96 are moved or slid toward each other to the inside within their respective slots 98, 99. This releases the pin flanges 93, 94 from the pin slider keepers 112, 113. This also releases the omega clamp 100 from the support tube 45.

Figure 6:
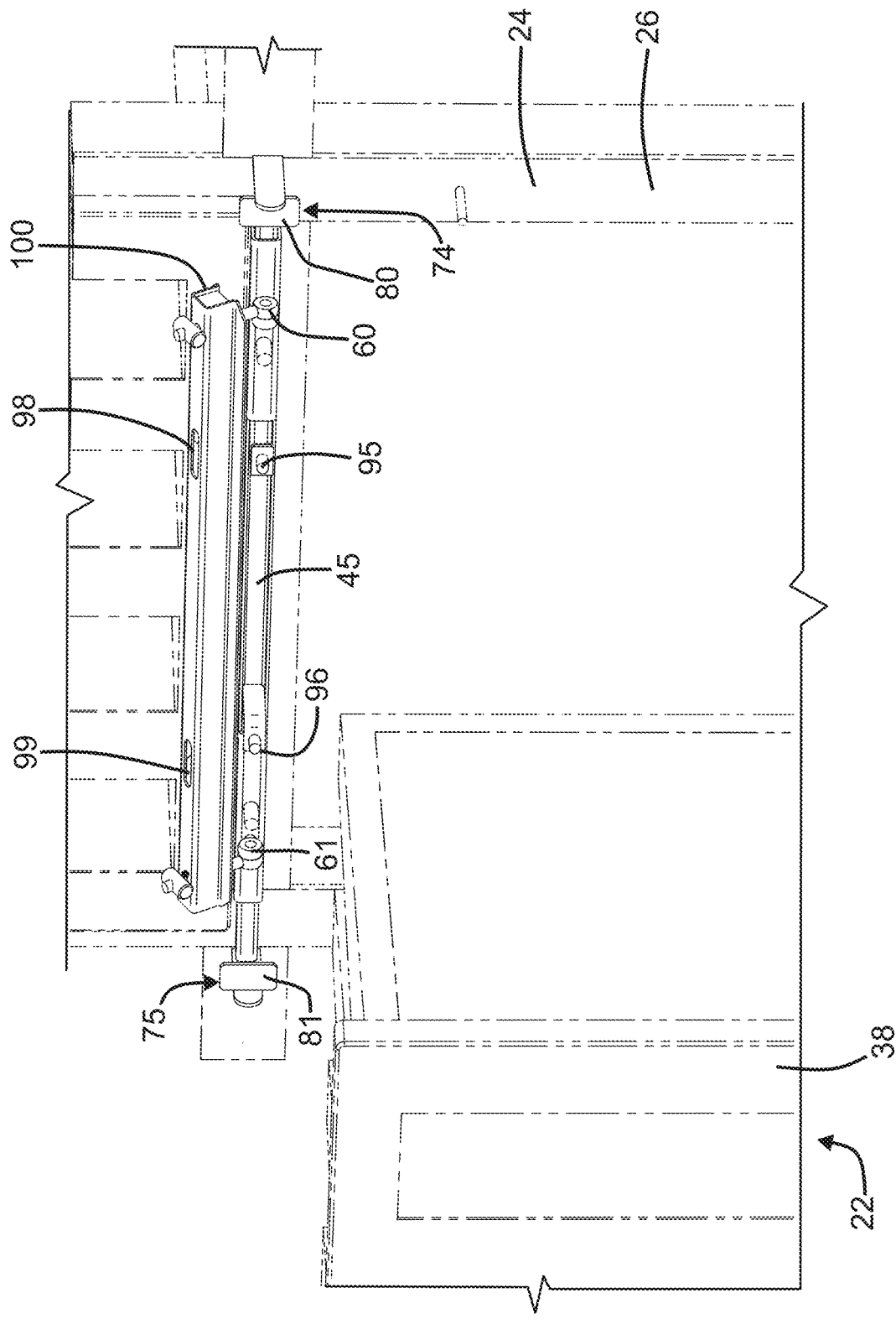
FIG. 6 is a perspective view showing one step of servicing the second filter elements.

Reference is now made to FIG. 6. The omega clamp 100 can then be pulled and lifted out of the way of the second filter element 22. In particular, it can be pivoted in the direction of arrows 63, 64 (FIG. 4) and along the pivot axis 62 either upwardly as shown in FIG. 6 or downwardly, along with pivot rods 58, 59. This then allows access to the second element 22, so that the second element 22 can be removed from the support grid 24.

A new second element 22 is provided and placed in the opening 28. The gasket 40 is pressed against the first side 29 of the support grid 24. The omega clamp 100 is then pivoted over the perimeter frame 38 of the second element 22 so that the gasket 40 of the second element 22 is pressed between and against the perimeter frame 38 (i.e., second side 38b) of the second element 22 and the support grid 24. The first element 20 is then placed directly across and in opposition to the second element 22 so that the gasket 36 of the first element 20 is pressed against the frame 38 (i.e., first side 38a) of the second element 22. The first and second clamps 74, 75 are then moved to the inside so that the flanges 80, 81 press against the second side 34b and hold the perimeter frame 34 of the first element 20.

The Example Embodiment of FIGS. 9-19

Figure 9:
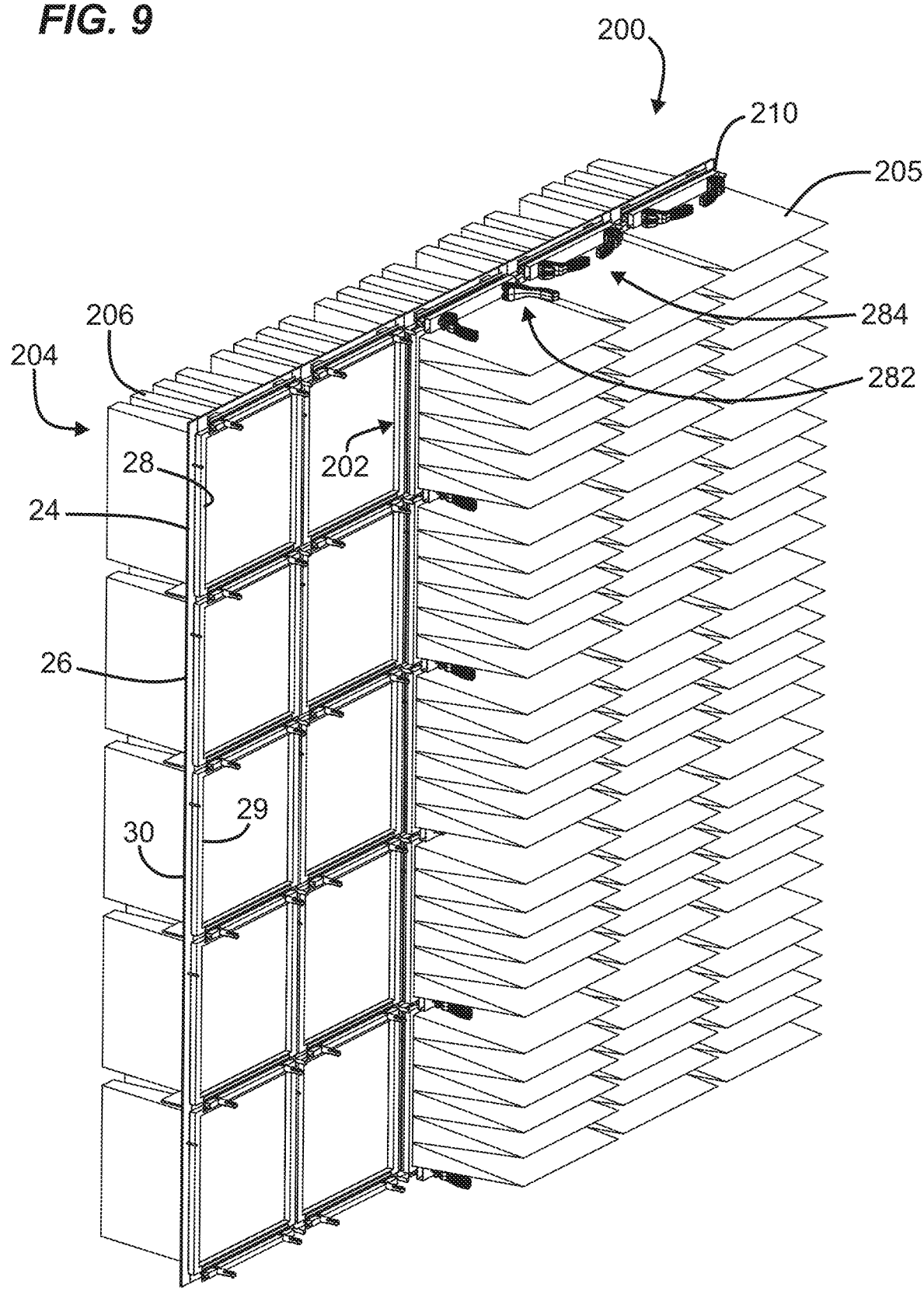
FIG. 9 is a perspective view of another embodiment of a gas turbine air inlet system, constructed in accordance with principles of this disclosure.
Figure 10:
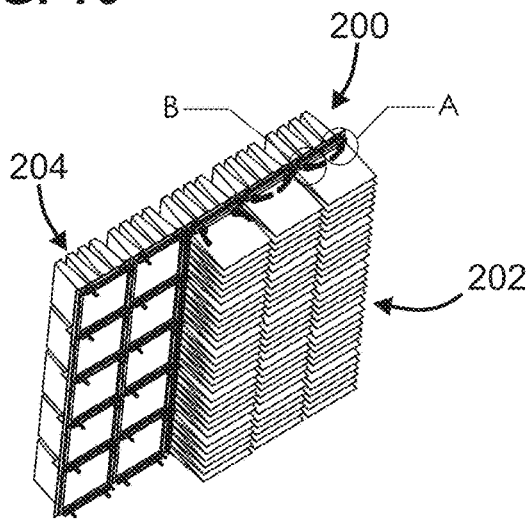
FIG. 10 is the system of FIG. 9, but smaller, to show reference to additional drawings.
Figure 11:
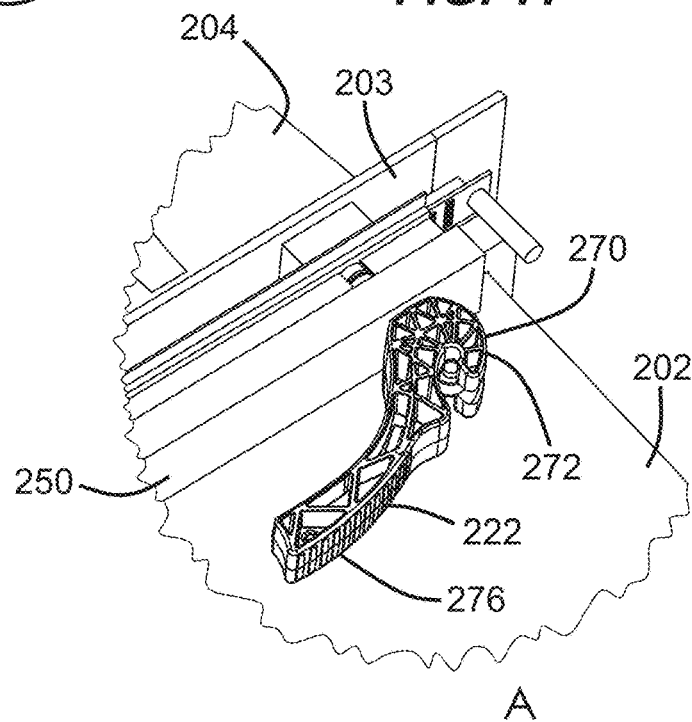
FIG. 11 is an enlarged view of the portion shown at A of FIG. 10.
Figure 12:
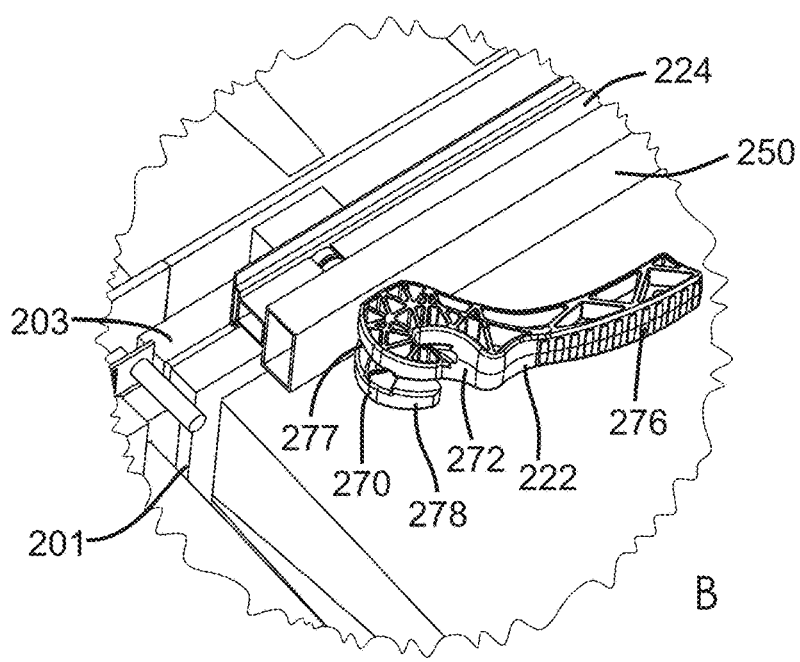
FIG. 12 is an enlarged view of the portion shown at B of FIG. 10.
Figure 15:
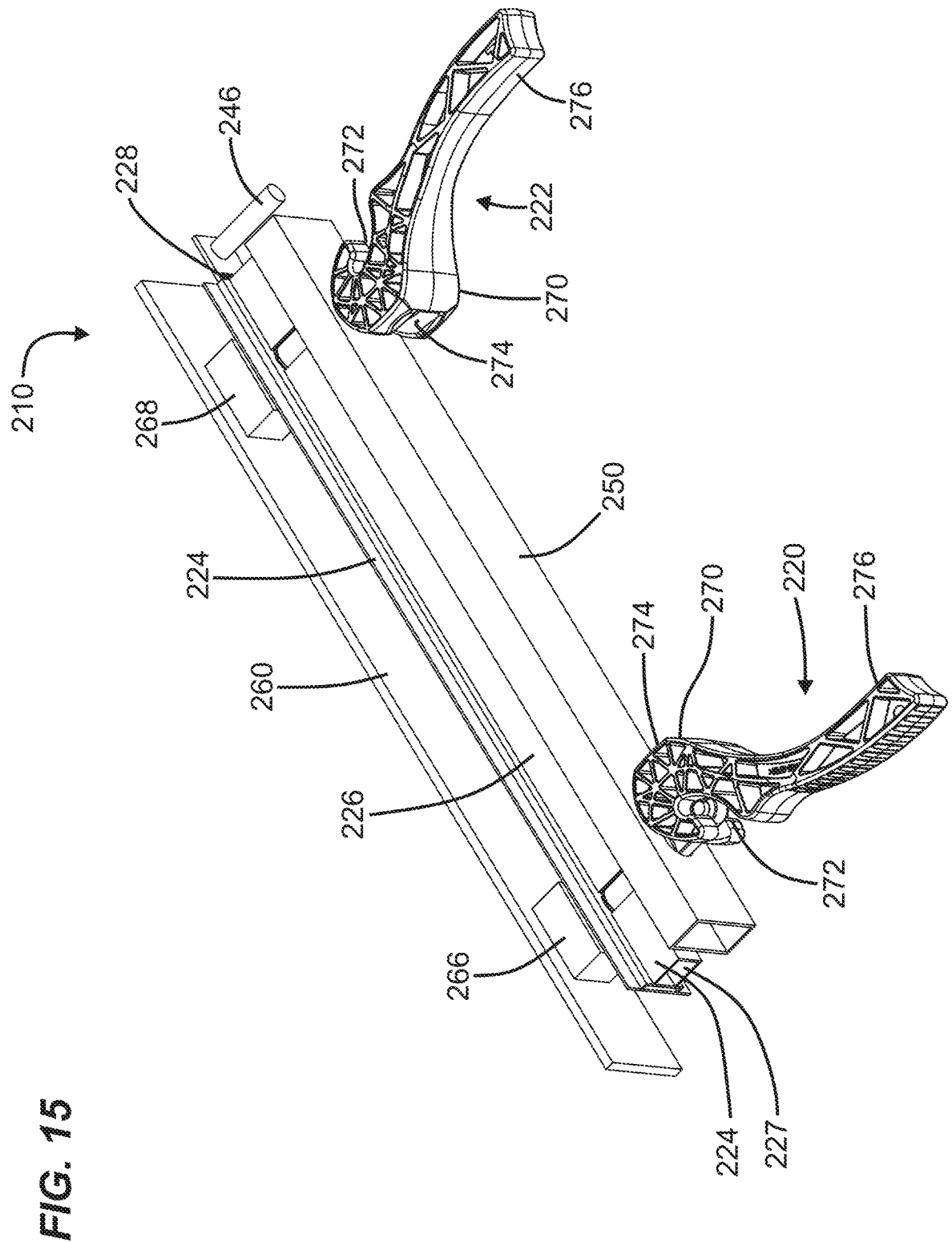
FIG. 15 is a perspective view showing a clamp system used in the air inlet system of FIG. 9.
Figure 16:
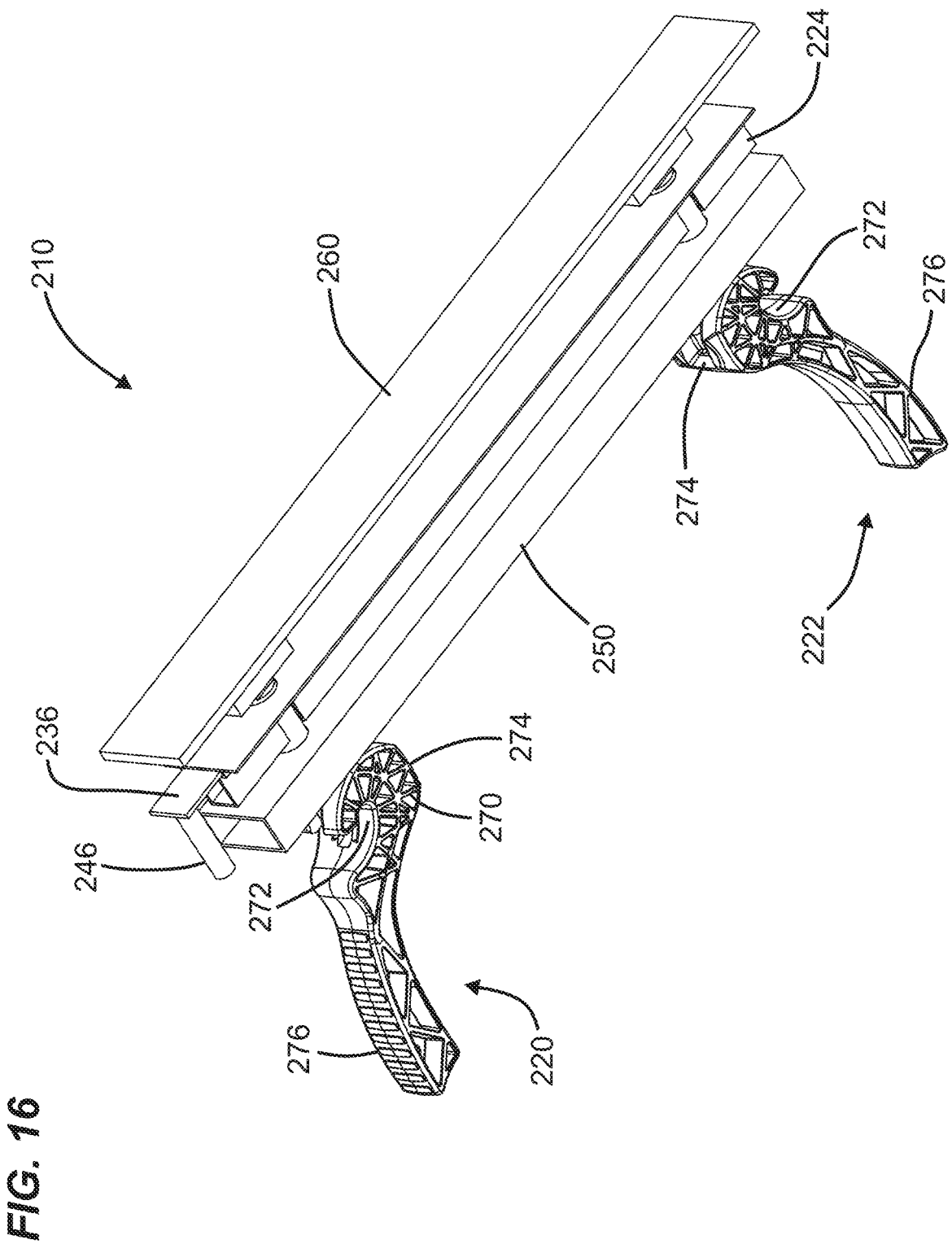
FIG. 16 is another perspective view of the clamp system of FIG. 15.

In FIG. 9, a gas turbine air inlet system is shown at 200. The gas turbine air inlet system 200 is similar to that as described in U.S. Pat. No. 8,673,040, incorporated herein by reference. There are rows and columns of filter elements arranged on a tube sheet or support grid, as described previously with respect to support grid 24. The support grid 24 includes frame 26 having upstream side 29 and opposite downstream side 30. Each opening in the support grid 24 accommodates at least one first filter element 202 on the upstream side 29 and one second filter element 204 on the downstream side 30. As can be seen in FIG. 9, the support grid 24 includes a matrix of several, for example hundreds, of first filter elements 202 on the upstream side 29 and second filter elements 204 on the downstream side 30.

As depicted, the first filter element 202 and second filter element 204 are typically oriented on the support grid 24 directly across from each other and covering one of the openings 28 in the support grid 24.

Many different types of filter elements can be used. In the example shown, the first filter elements 202 comprise pocket filter elements 205, while the second filter elements 204 comprise v-bank filter elements 206. Example pocket filter elements are described in U.S. Pat. No. 7,931,723, incorporated herein by reference. Example v-bank filter elements are described in U.S. Pat. No. 8,425,644, U.S. Ser. No. 10/486,094, U.S. Pat. Nos. 7,334,490, 9,623,356, and 8,951,321, each of which is incorporated herein by reference. In other embodiments, the first filter elements 202 could also be v-bank filter elements.

The first filter element 202 and the second filter element 204 each has a perimeter gasket 201, 203, which is constructed and arranged to be axially pressed to form a seal.

As with the embodiment of FIGS. 1-8, a single clamp system 210 is used to releasably secure both a first filter element 202 and second filter element 204 to the frame 26 of the support grid 24.

In reference now to FIGS. 16-19, clamp system 210 is depicted. The clamp system 210 releasably attaches the filter assembly, comprising the first filter element 202 and the second filter element 204 to the support grid 24. The clamp system 210 includes a plurality of clamp rods 212, 214.

In the example shown, each clamp system 210 includes two clamp rods 212, 214. The clamp rods 212, 214 will generally be non-removably secured to the frame 26 to project therefrom. Each of the rods 212, 214 has a cylindrical base 216 extending from a grid engaging portion to about halfway of the length of the rod 212, 214. The other half of the rod 212, 214 extending to a free (terminal) end has a narrowed section 218 being a handgrip-engaging section 218 shaped to receive one of the handgrips 220, 222. The narrowed section 218 comprises a projection 219 extending from a side or lateral portion thereof.

The clamp system 210 further includes a first elongated support member or tube 224. The first support tube 224 can be many different shapes having a variety of cross-sections. In the particular, non-limiting example shown, the first support tube 224 includes a generally rectangular cross-sectional wall 226 with opposite open ends 227, 228. The wall 226 is positioned on a flange plate 230 supporting it along the length.

The support tube 224 can have a single (FIGS. 45-49) or a plurality of openings. In the non-limiting example shown in FIGS. 9-19, there are two openings 232, 234. In this case, the openings 232, 234 match up and are in axial alignment with the clamp rods 212, 214. Each opening 232, 234 is sized to receive or be fit over one of the clamp rods 212, 214. Openings 232, 234 also extend through the flange plate 230.

The clamp system 210 further includes a first slide plate 236. The first slide plate 236 is removably and slidably mounted in the first support tube 224. In the example shown, the first slide plate 236 is insertable through the open end 228 and is within the rectangular wall 226.

The first slide plate 236 has openings shown at 238, 240. The openings 238, 240 are alignable with the openings 232, 234 of the first support tube 224. The openings 238, 240 can be shaped to assist with locking the second filter element 204 in sealing engagement with the grid 24, as further describe below. In the example shown, the openings 238, 240 have a narrowed region 242 and a wider region 244.

The first slide plate 236 further includes an end handle 246. The end handle 246 will project out of the first support tube 224 extending from the open end 228, when the first slide plate 236 is positioned within the first support tube 224. The end handle 246 can be used to move the slide plate 236 between the locked and unlocked position. The end handle 246 is generally perpendicular to a remaining portion of the first slide plate 236.

The clamp system, 210 further includes a second elongated support profile, member, or tube 250. The second support tube 250 further includes a plurality of openings shown at opening 252 and 254. Each opening 252, 254 is arranged and sized to fit over one of the clamp rods 212, 214.

The second support tube 250 has a rectangular cross-sectional wall 256. The wall 256 has opposite open ends 257, 258. The openings 252, 254 extend through opposing sides of the wall 256.

Figure 18:
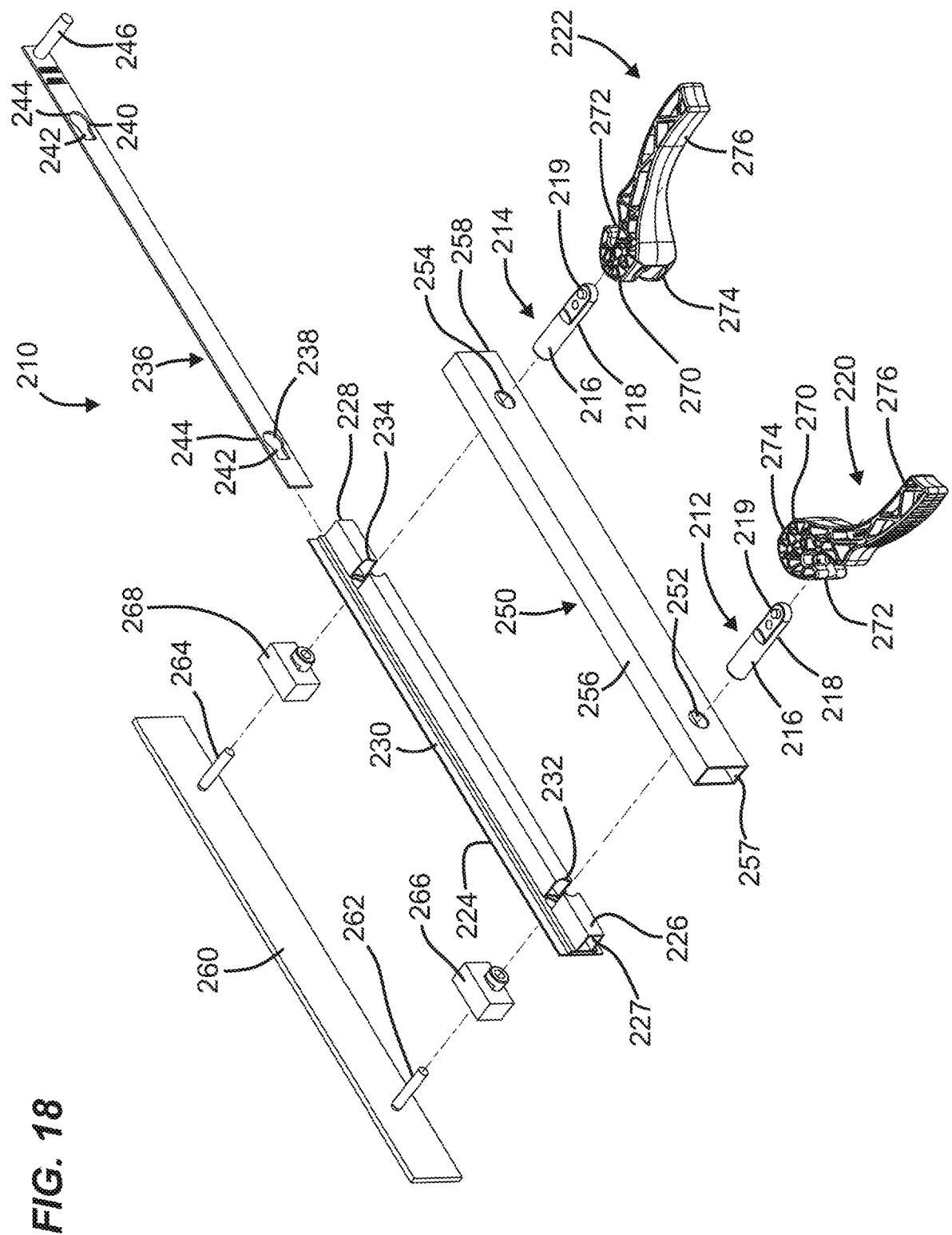
FIG. 18 is an exploded perspective view of the clamp system of FIG. 15.

Also shown in FIG. 18 is a mounting plate 260 with posts 262, 264 projecting therefrom. Mounting bases 266, 268 receive the posts 262, 264. The mounting bases 266, 268 are secured to the rods 212, 214. The assembly including the plate 260 with posts 262, 264 and mounting bases 266, 268 are secured to or can be integral with the support grid 24. Many variations are possible.

The hand grips 220, 222 are analogous to the maintenance tool 70 described previously. The hand grips 220, 222 are constructed and arranged to engage one of the clamp rods 212, 214 and apply an axial force against the support tube 250.

The hand grips 220, 222 each include a head 270. The head 270 defines a recess 272 sized to engage the grip engaging section or narrower section 218 of the rods 212, 214. Each head 270 further includes a cam surface 275 in the form of a flattened area and on a portion of the head 270 that is opposite of the recess 272. A grasping handle 276 is sized for comfortable gripping by a human hand extends from the head 270.

Figure 19:
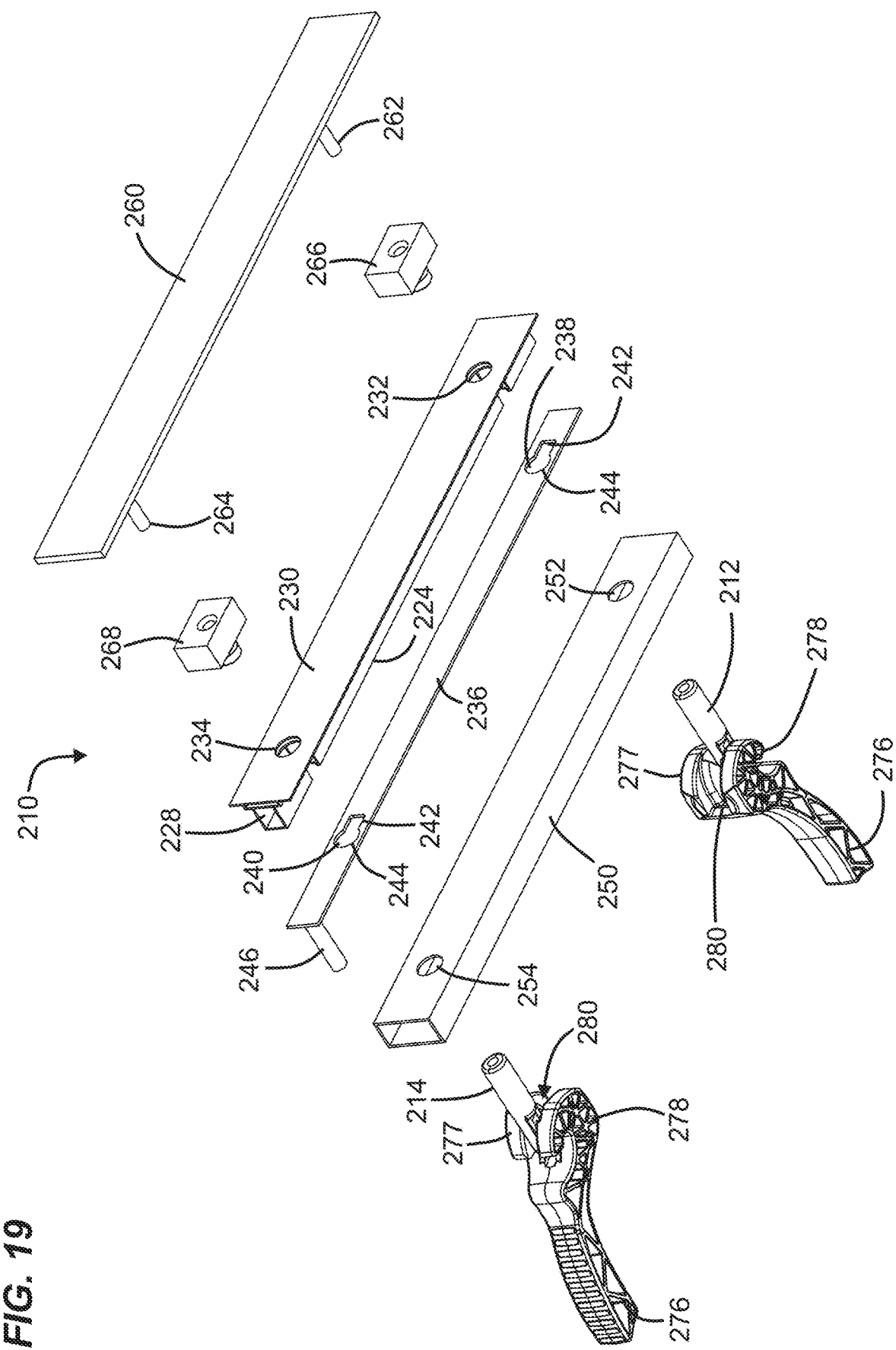
FIG. 19 is another exploded perspective view of the clamp system of FIG. 15.
Figure 20:
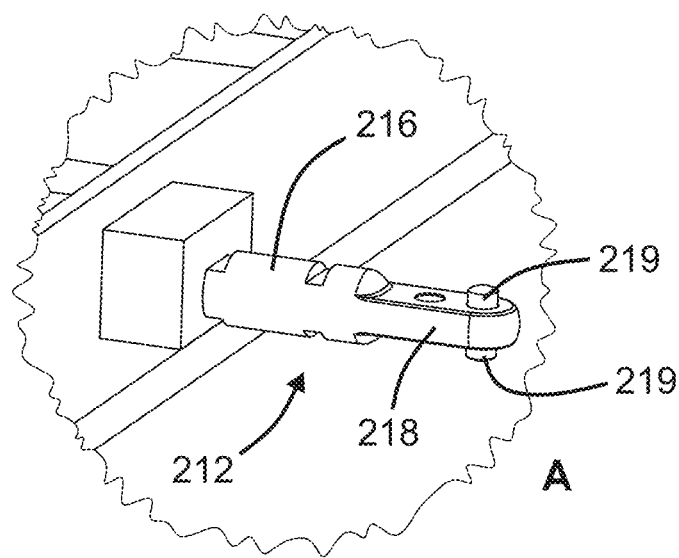
FIG. 20 is a perspective view of a clamp rod used in another embodiment of a clamp system shown in FIGS. 24-39.
Figure 21:
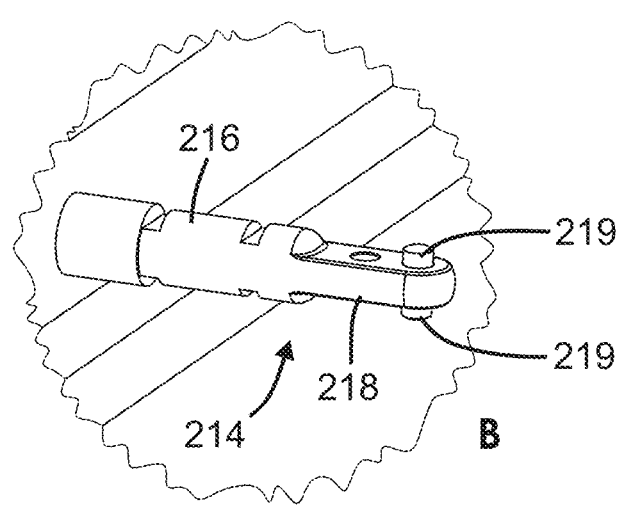
FIG. 21 is a perspective view of another clamp rod used in clamp system of FIGS. 24-39.
Figure 22:
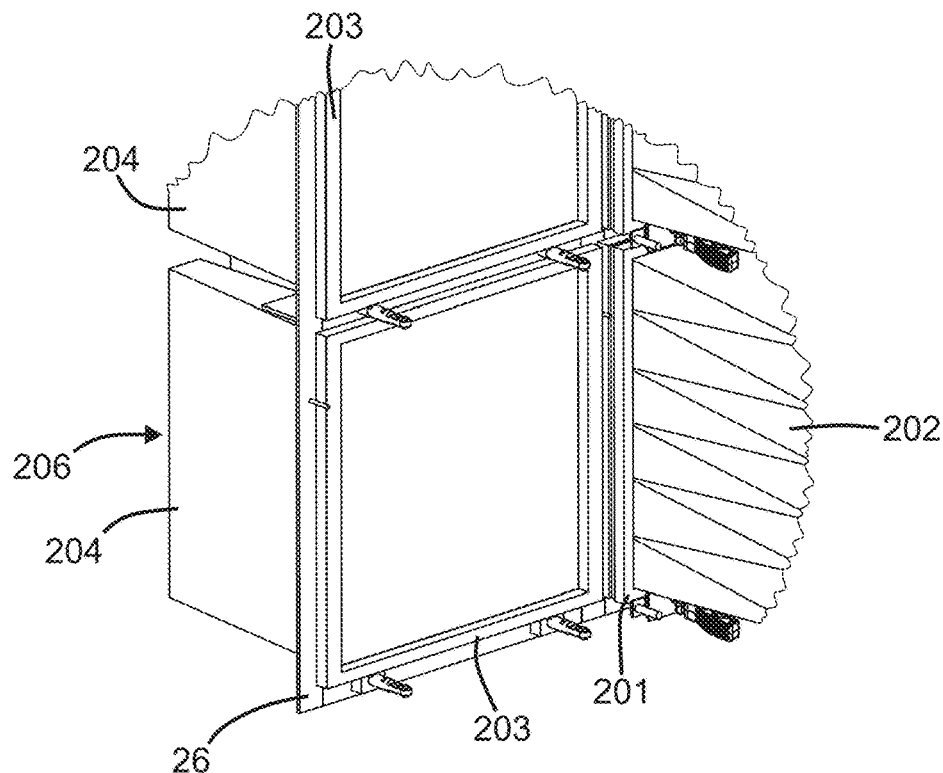
FIG. 22 is a perspective view of a portion of the air inlet system using the clamp system of FIGS. 24-39.
Figure 23:
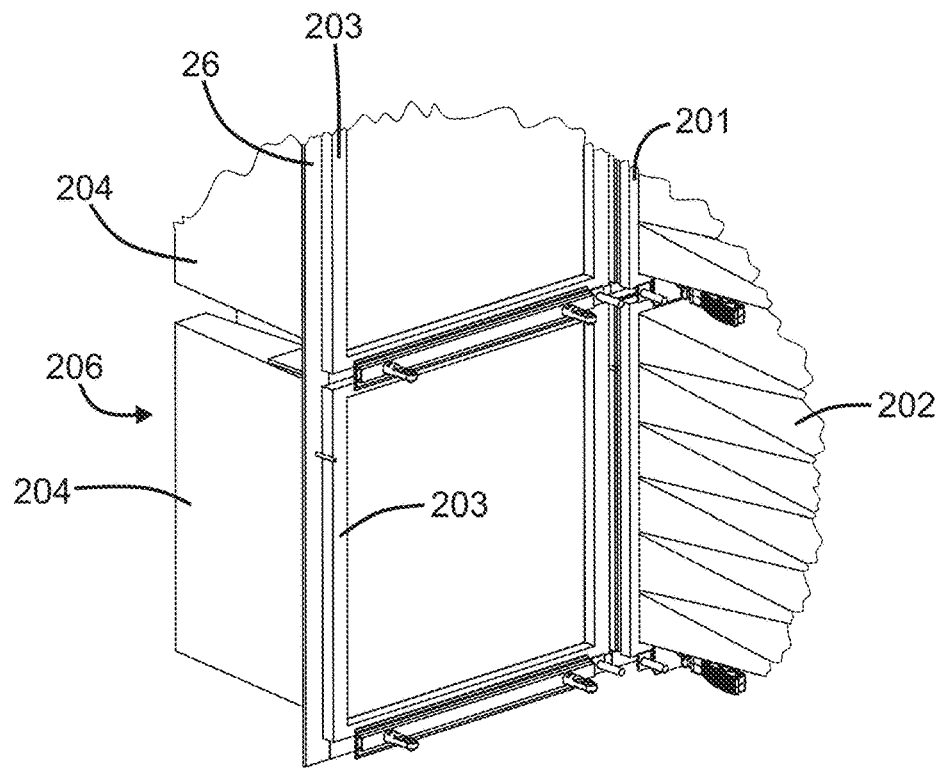
FIG. 23 is a view similar to FIG. 22, but showing another part of the clamp system of FIGS. 24-39.
Figure 27:
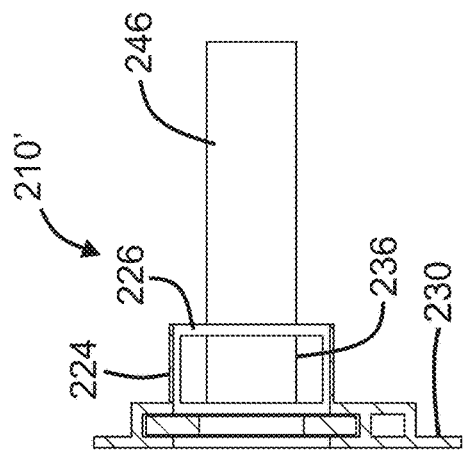
FIG. 27 is a cross-sectional view of section 27-27 of FIG. 26.
Figure 26:
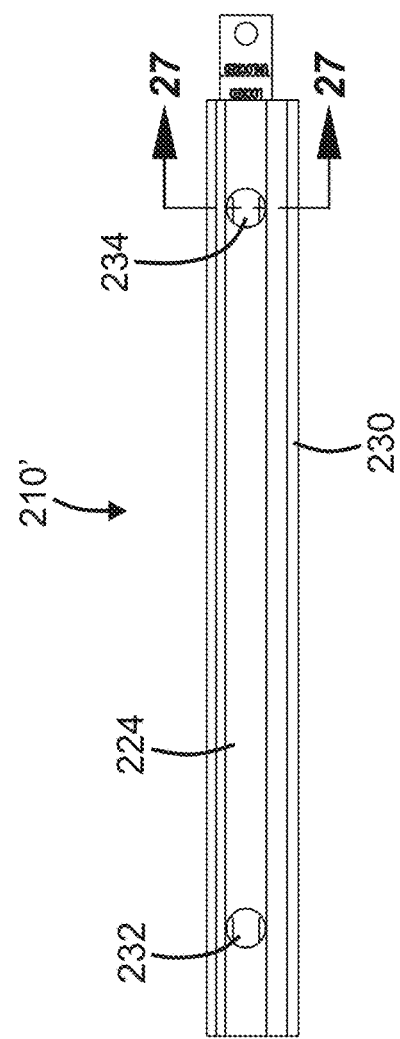
FIG. 26 is a front view of the clamp system of FIG. 24.
Figure 31:
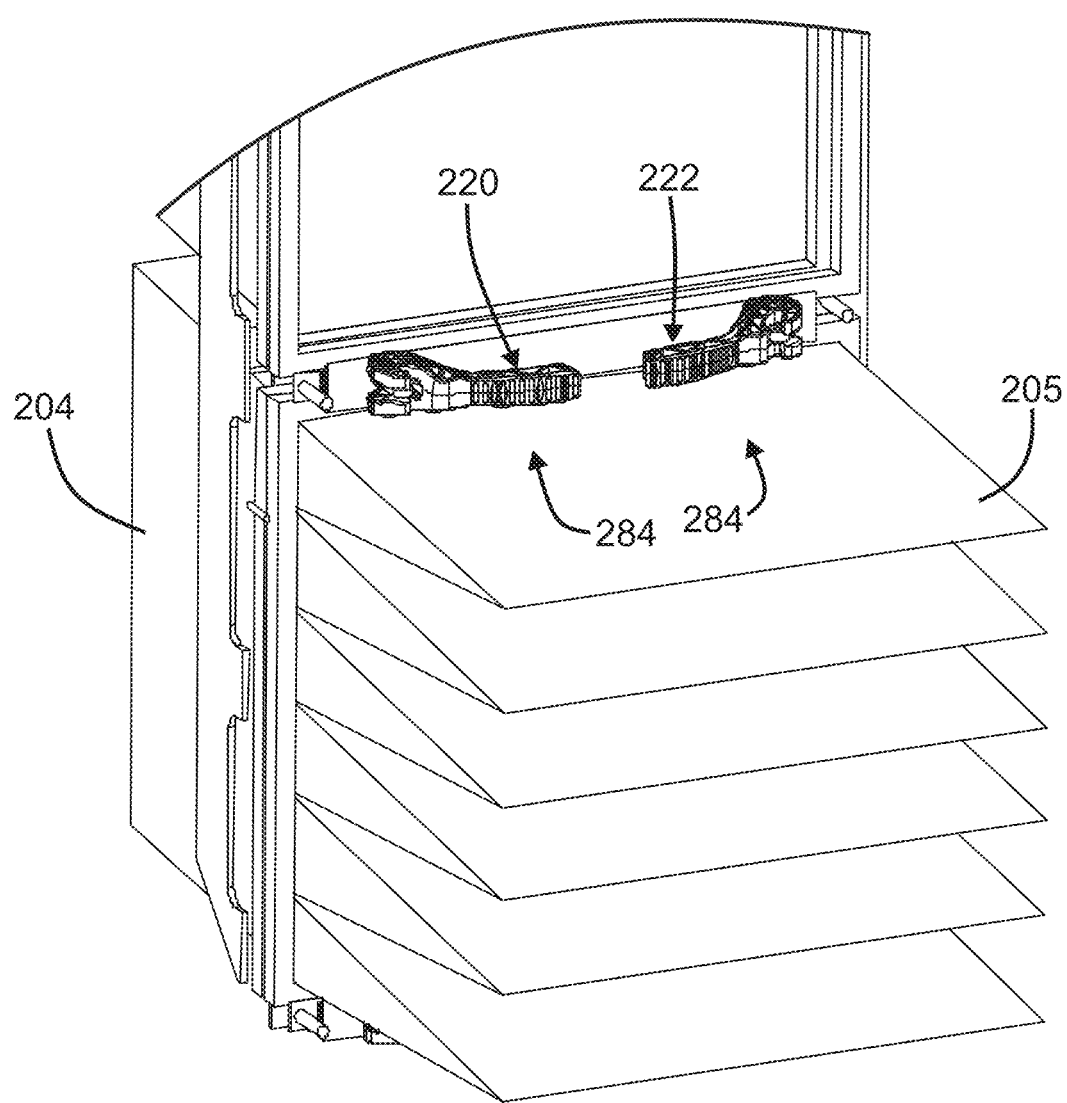
FIG. 31 is a perspective view showing another step of applying the clamp system of FIGS. 24-27.
Figure 32:
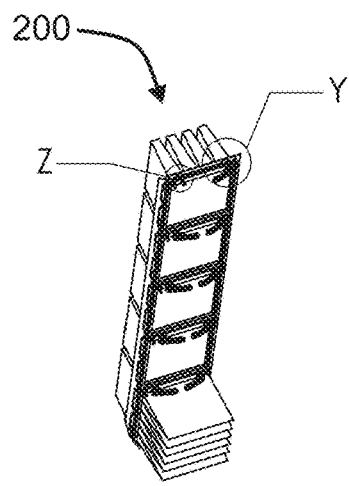
FIG. 32 is a perspective view of a portion of the air inlet system having the clamp system of FIGS. 24-27.
Figure 33:
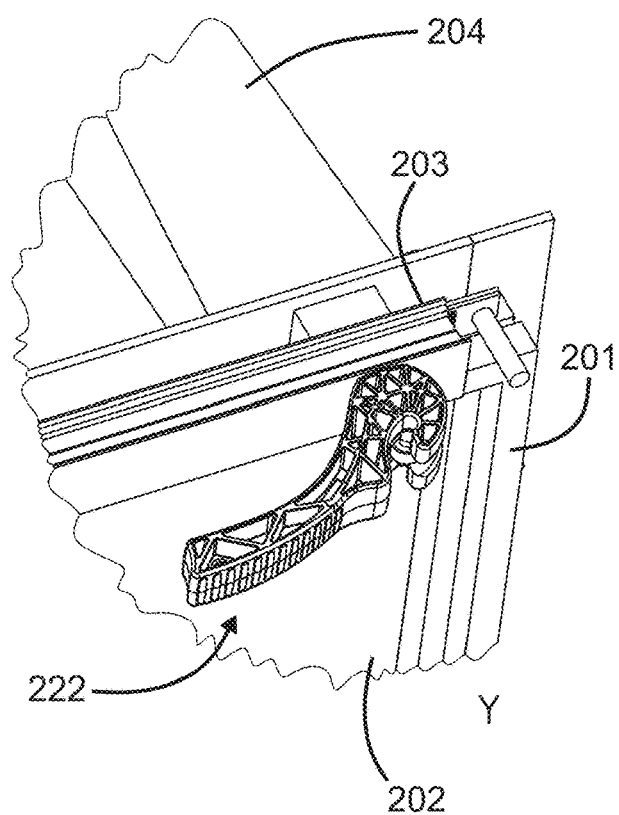
FIG. 33 is an enlarged perspective view of the portion shown at Y of FIG. 32.
Figure 34:
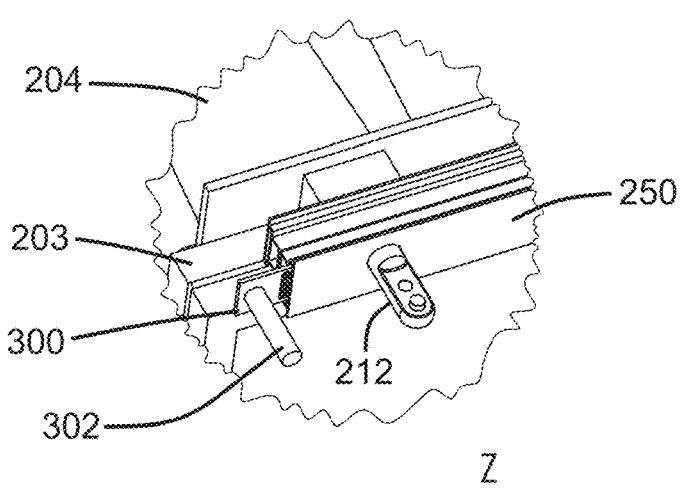
FIG. 34 is an enlarged perspective view of the portion shown at Z of FIG. 32.
Figure 35:
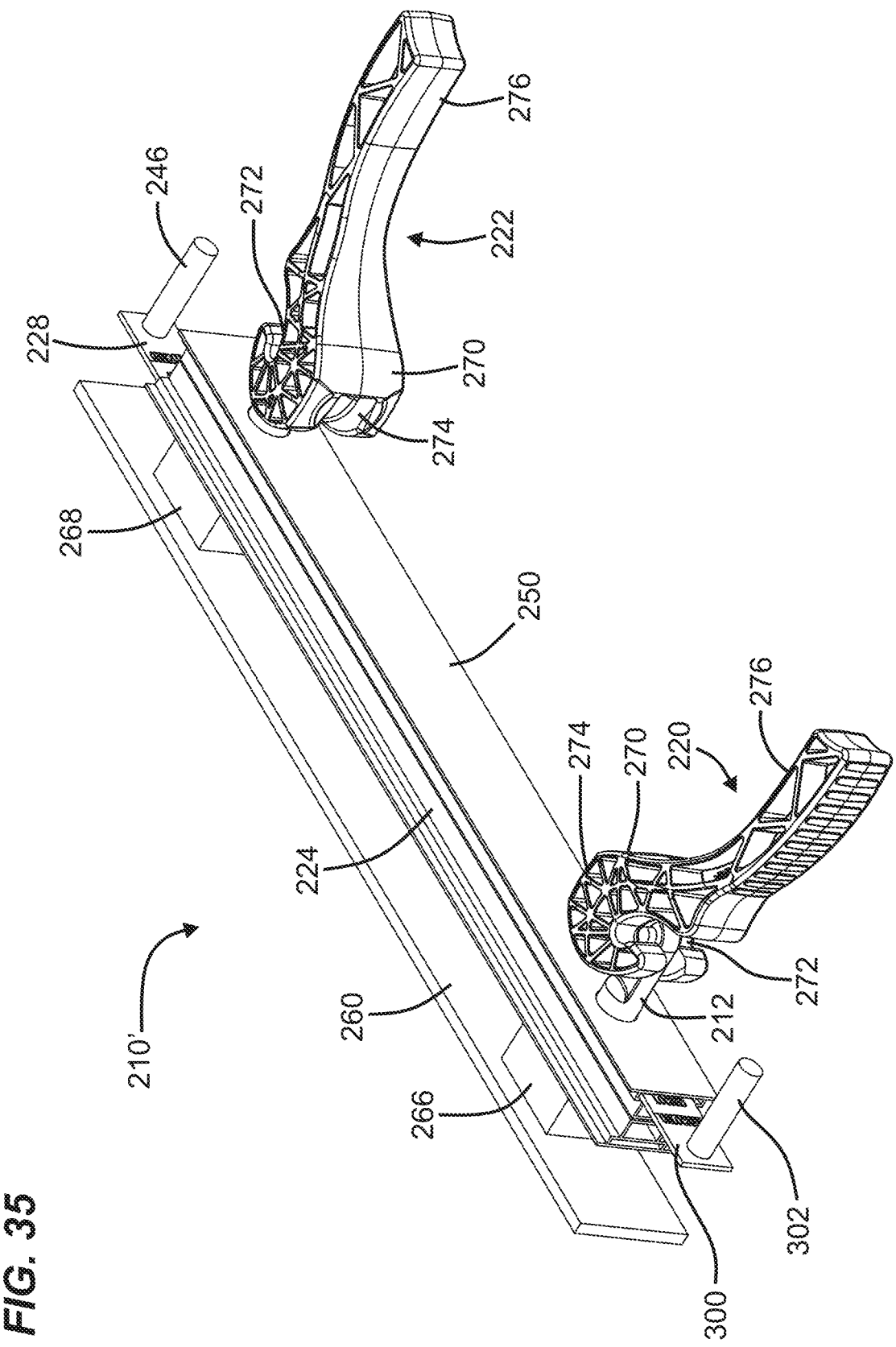
FIG. 35 is a perspective view showing the clamp system of FIGS. 24-27.
Figure 36:
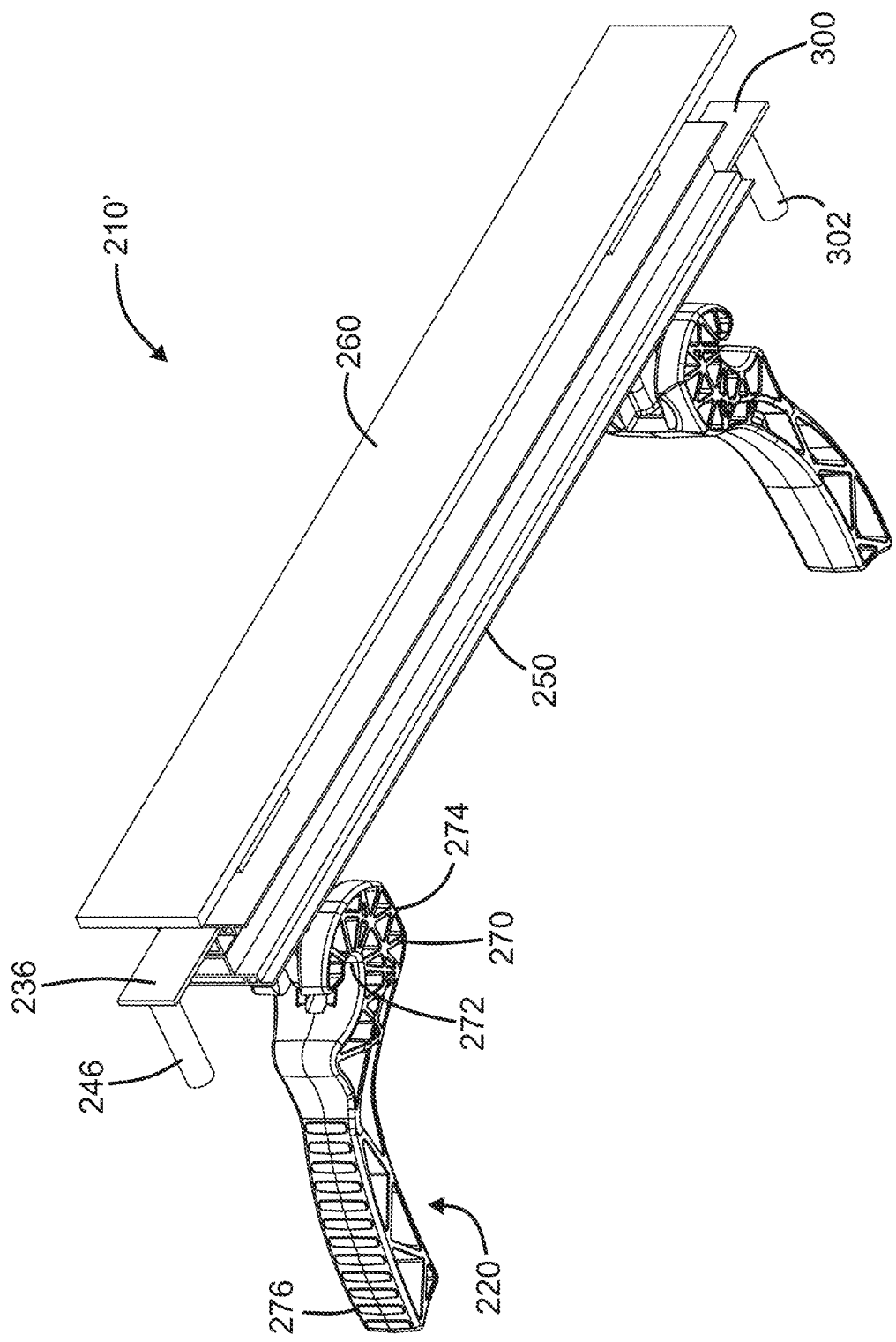
FIG. 36 is another perspective view of clamp system of FIG. 35.
Figure 37:
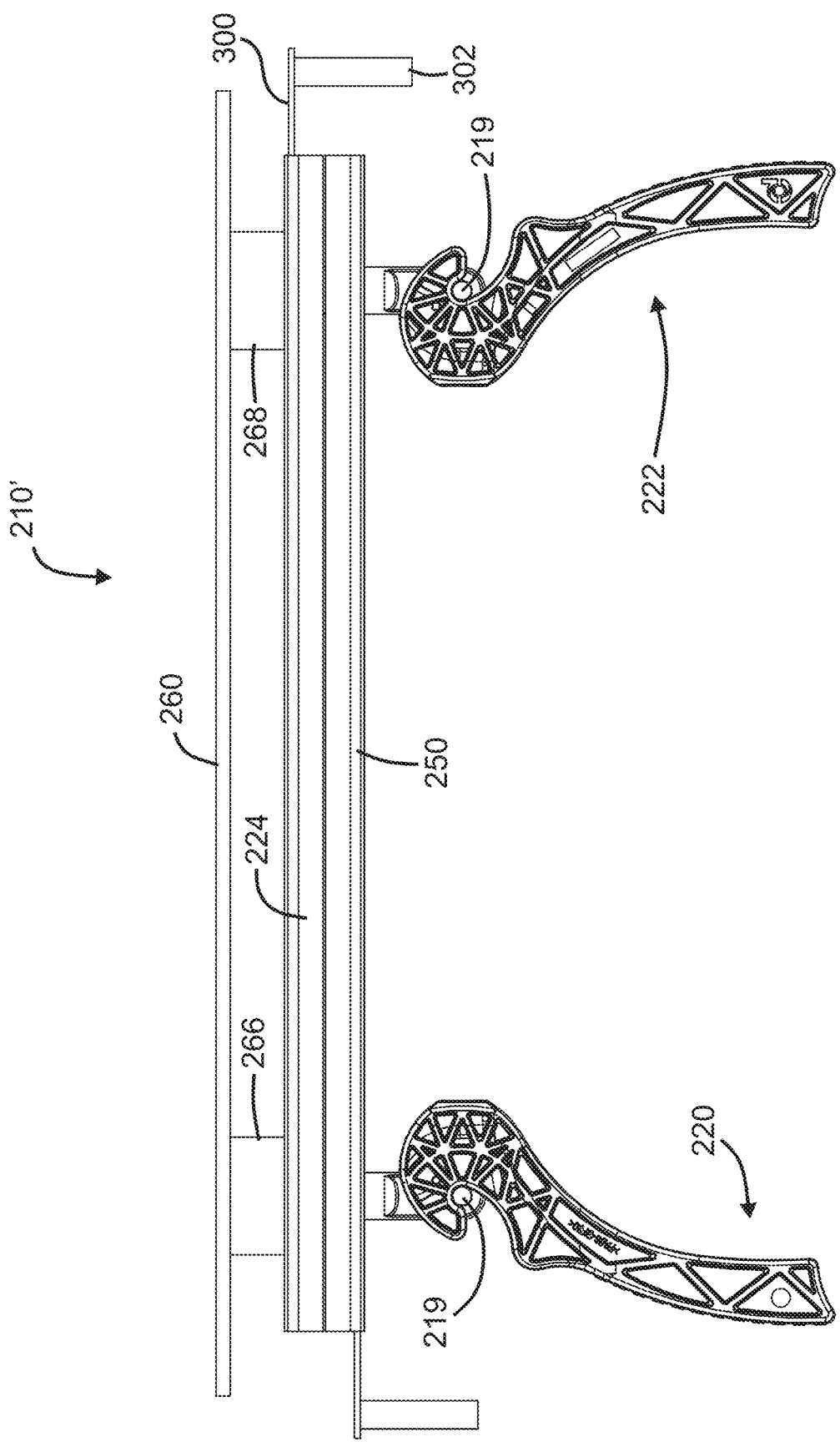
FIG. 37 is a top plan view of the clamp system of FIG. 35.

In FIG. 19, it can be seen how each hand grip 220, 222 has its head 270 split into head pieces 277, 278. Between the head pieces 277, 278 is a receiving slot 280. The receiving slot 280 is sized to fit around the hand grip engaging section 218 of the rods 212, 214. Each head piece 277, 278 includes recessed 272, which will hook onto the projection 219 of the rods 212, 214.

Figure 17:
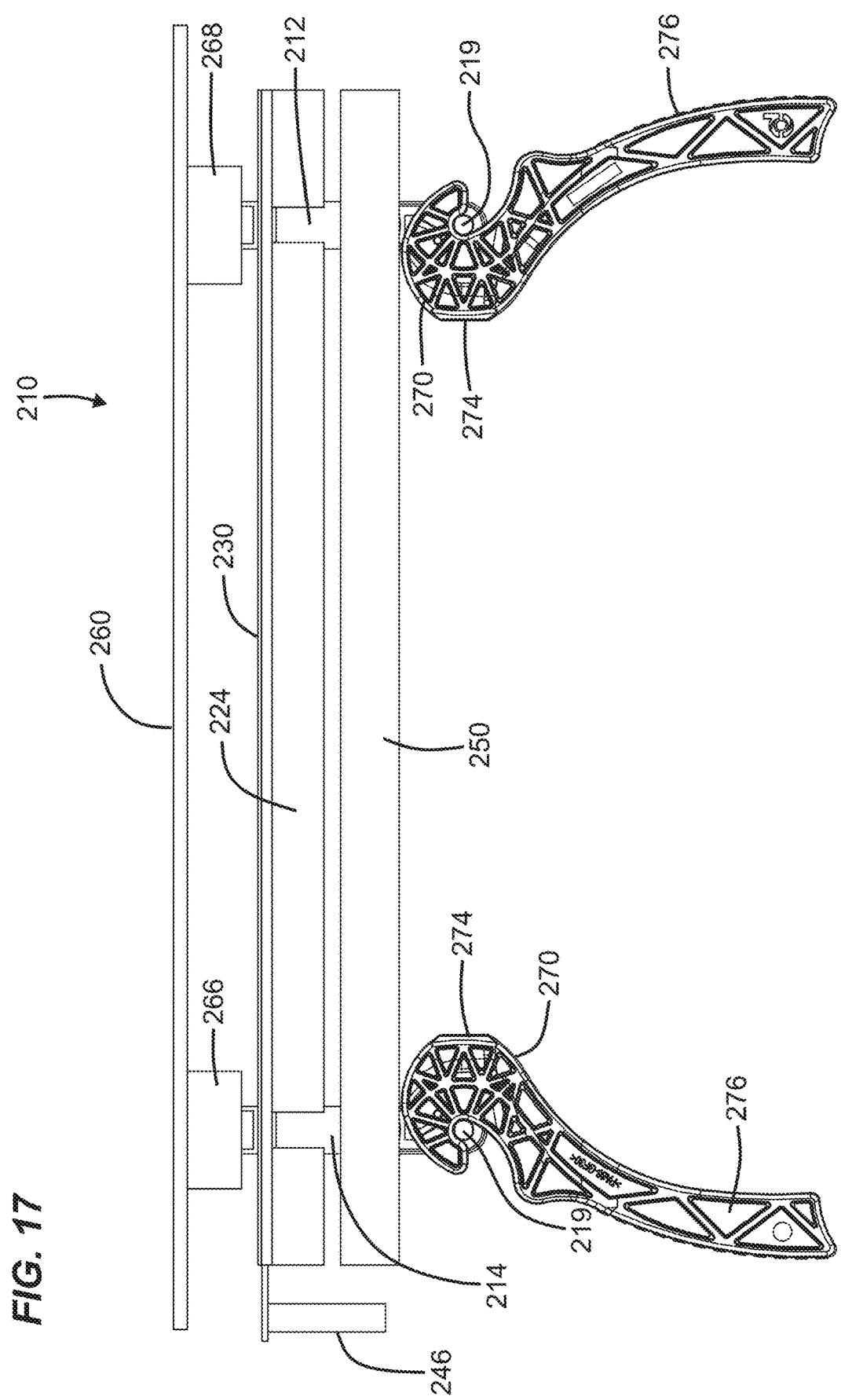
FIG. 17 is a top plan view of the clamp system of FIG. 15.

In use, the hand grips 220, 222 can be fit around the rods 212, 214 such that the recess 272 in the head 270 will engage the projection 219, and the hand grip 220 can be pivoted from an unlocked position shown at 282 in FIGS. 9 and 17 to a locked 284 also shown in FIG. 9. The unlocked position includes the cam surface 272 being out of engagement with the second support tube 250 and the handles 276 extending away from the support grid 24. The locked position 284 include the cam surface 274 being against the second support tube 250 and the handles 276 generally pointing to each other and almost generally parallel to the support grid 24.

In the system of FIGS. 9-19, the second filter element 204 is initially placed through one of the openings in the support grid 24 such that it is on the downstream side 30, with its gasket 203 on the upstream side 29 and against the frame 26. The first support tube 224 along with the first slide plate 236, is then placed over the rods 212, 214, such that the flange plate 230 of the support tube 224 is against a header frame of the second filter element 204. The slide plate 236 can then be moved or slid by pulling on end handle 246 in a direction laterally outwardly from the second filter element 204. The gasket 203 is not yet compressed.

Next, the second support profile or tube 250 is placed over the rods 212, 214, and the hand grips 220, 222 are loosely fit onto the clamp rods 212, 214. The first filter element 202 is then installed by placing the header frame of the first filter element 202 underneath the second support tube 250. The hand grips 220, 222 are then rotated from a position where the handles 276 are generally perpendicular to the frame 26, to a position in which the handles 276 are generally parallel to the frame 26. This will compress both of the gaskets 201, 203 of the first filter element 202 and second filter element 204. Next, the slide plate 236 is moved or slid by grasping the end handle 246 and moving it in a direction toward the elements 202, 204, which keeps the second filter element 204 clamped with the gasket 203 in the compressed state and allows for online changing of the first filter elements 202.

To service the filter arrangement of FIGS. 9-19, the process is done in reverse, by releasing the clamp system 210 holding both the first filter element 202 and second filter element 204 in place and in sealing engagement on the support grid 24. While the second filter element 204 remains in sealing engagement, the first filter element 202 is removed. A replacement first filter element 202 is provided and the single clamp system 210 is engaged to seal the replacement first filter element 202 to the support grid 24.

The step of engaging the single clamp system 210 can include grasping the hand grips 220, 222 and rotating the hand grips 220, 222 from an open position to a closed position to apply an axial force against the clamp system 210. After rotating the hand grips 220, 222, the first slide plate 236 can be moved to lock the second filter element 204 into a sealed position against the support grid 24.

Periodically, the second filter element 204 can also be replaced. This is done by, after removing the first filter element 202, sliding the slide plate 236 to an unlocked or released position by moving it laterally (sideways) away from the elements 202, 204. This releases the seal of the gasket 203 on the second element 204. The first support tube 224 can then be removed, which allows the second filter element 204 to be removed from the frame 26. A replacement second element 204 is then provided and inserted into the opening in the frame 26, with the gasket 203 against the upstream side 29 of the frame 26. The first support tube 224 is again mounted onto the rods 212, 214. The second support tube 250 is then mounted onto the rods 212, 214, and the first filter element 202 is oriented so that the gasket 201 is between the first support tube 224 and second support tube 250. The hand grips 220, 222 are rotated such that the cam surface 274 is moved against the second support tube 250 to apply axial force to the first and second support tubes 224, 250 compressing the gaskets 201, 203. The first slide plate 236 is then moved into a locked position, sliding in a direction toward the elements 202, 204.

The Example Embodiment of FIGS. 20-39

Figure 38:
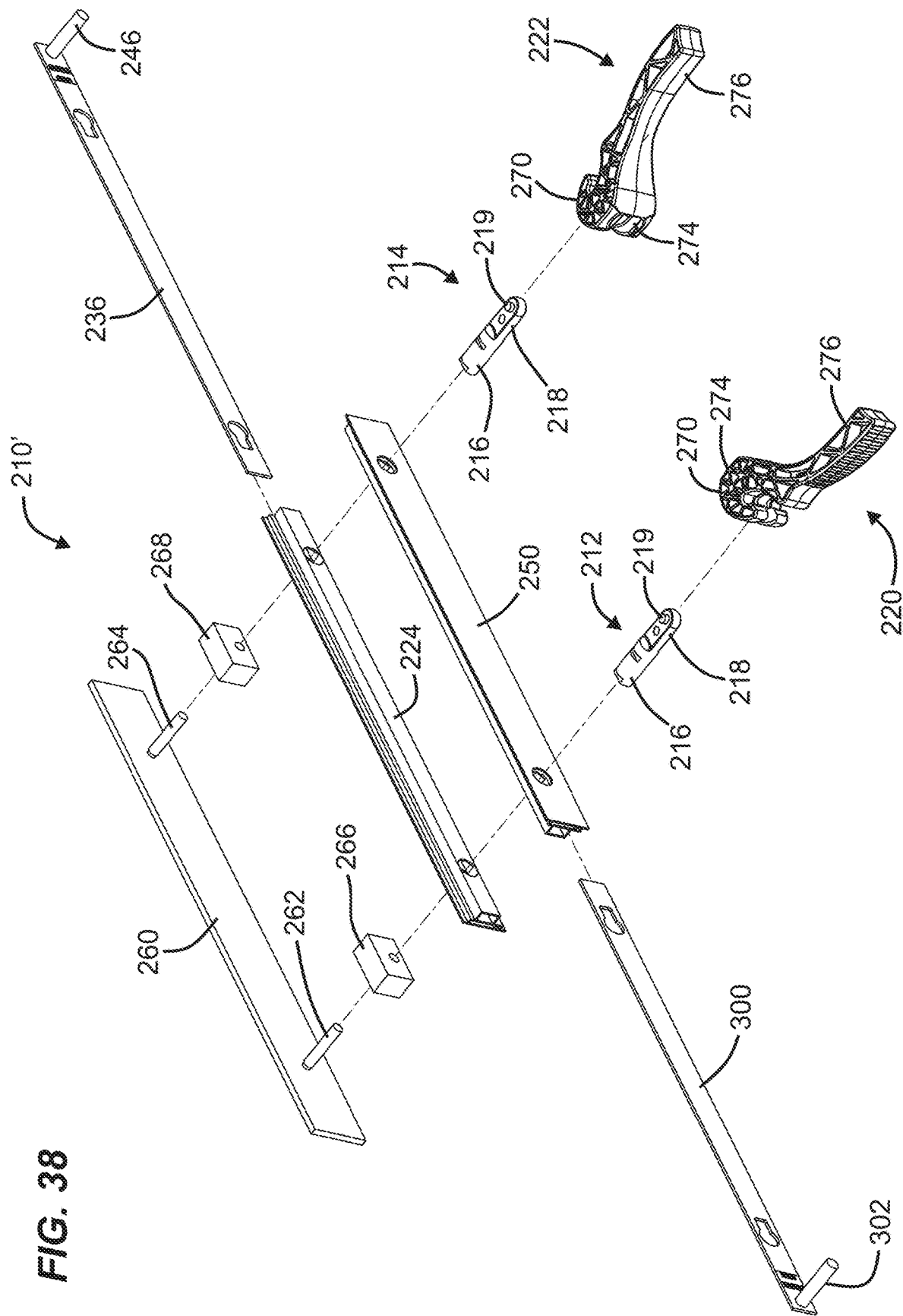
FIG. 38 is an exploded perspective view of the clamp system of FIG. 35.
Figure 39:
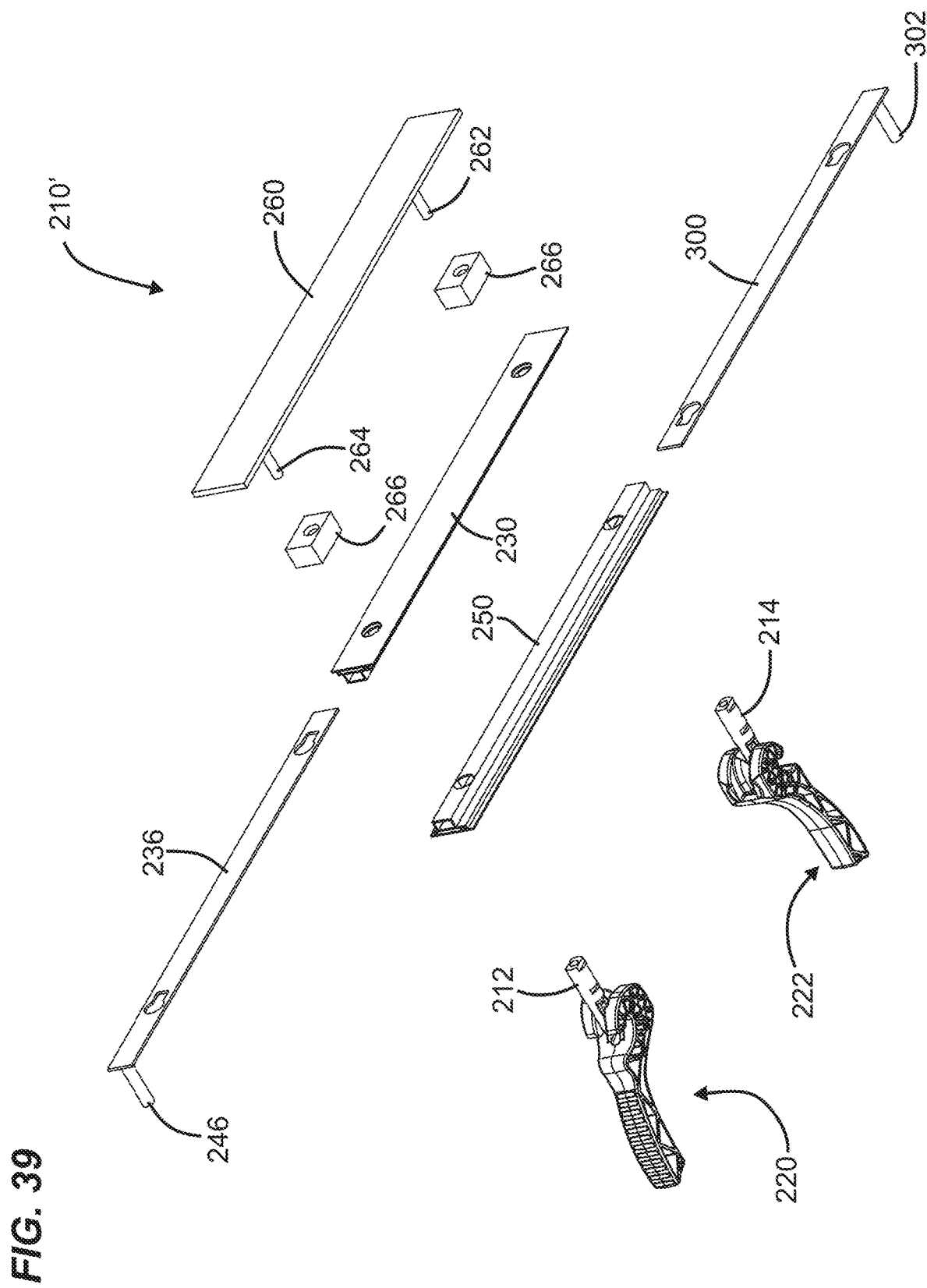
FIG. 39 is another exploded perspective view of the clamp system of FIG. 35.
Figure 40:
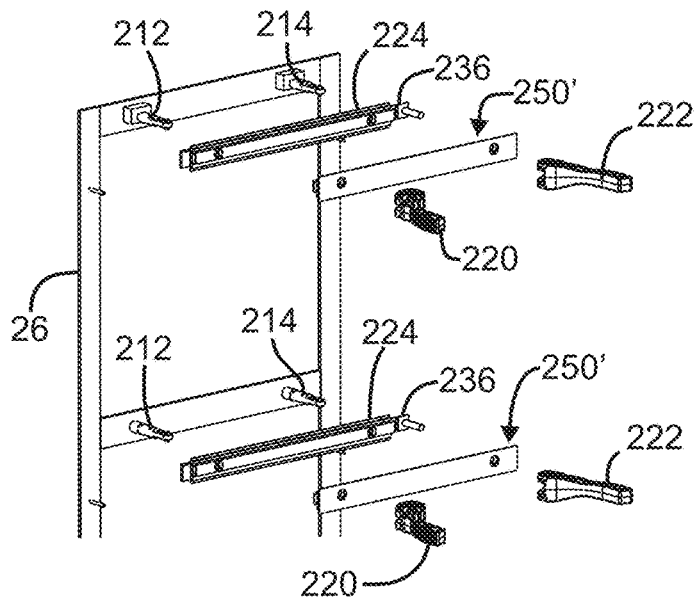
FIG. 40 is an exploded perspective view of a variation of the system of FIGS. 9-19.
Figure 41:
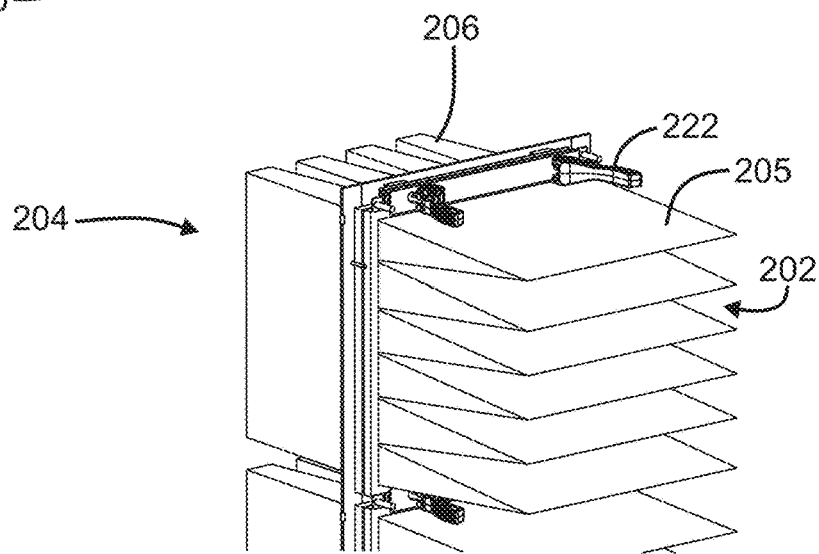
FIG. 41 is a perspective view of a portion of the system of FIG. 40.
Figure 42:
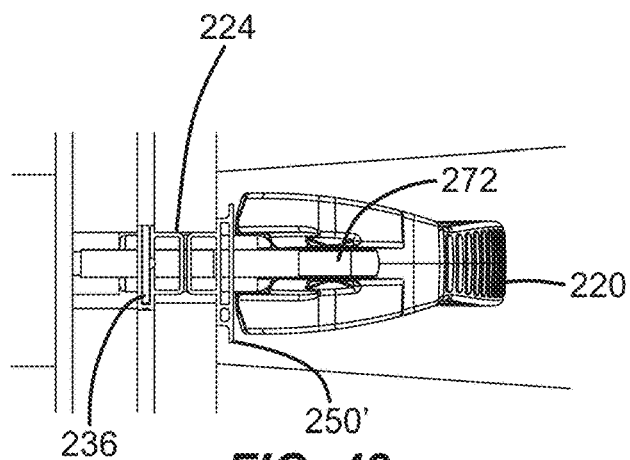
FIG. 42 is an enlarged cross-sectional view of a portion of FIG. 41.
Figure 43:
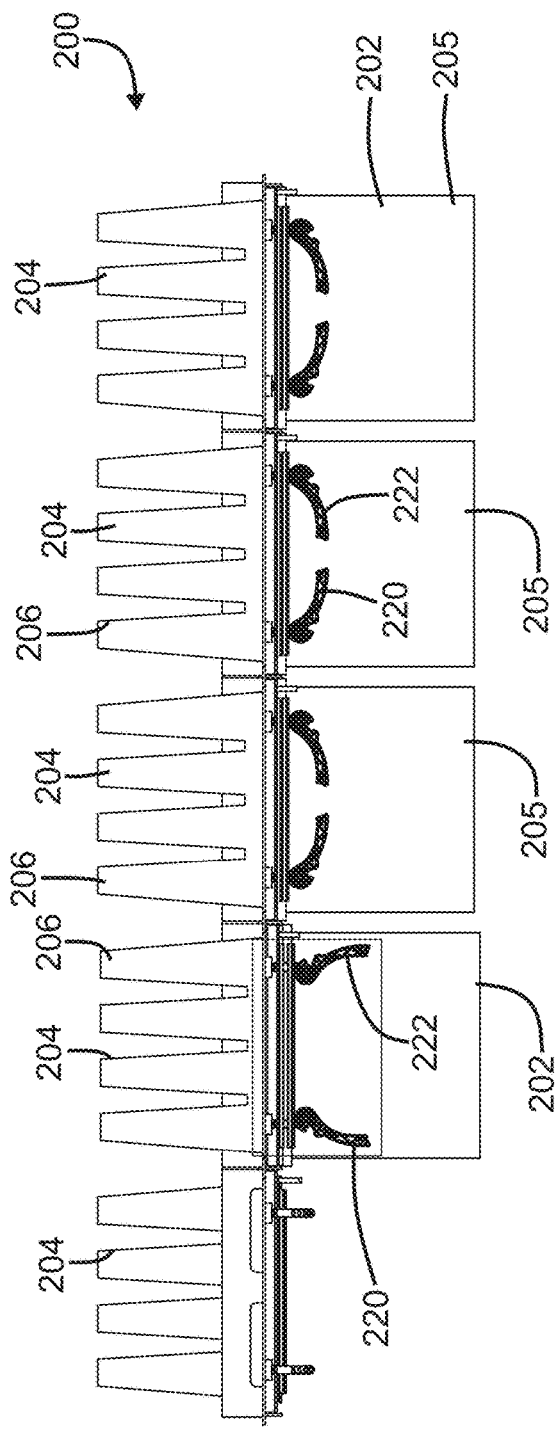
FIG. 43 is a top plan view of the system of FIG. 40.
Figure 44:
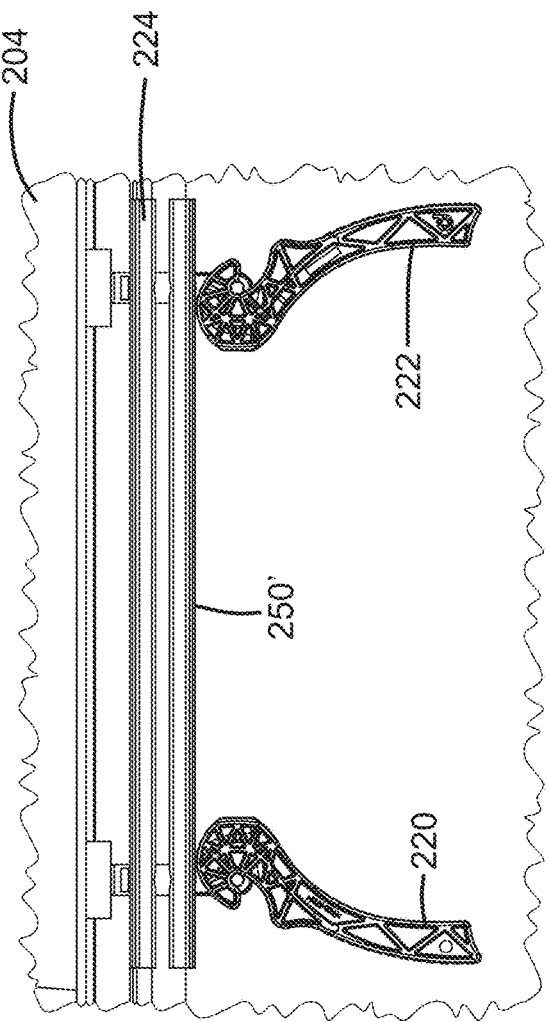
FIG. 44 is an enlarged view of a portion of FIG. 43.
Figure 45:
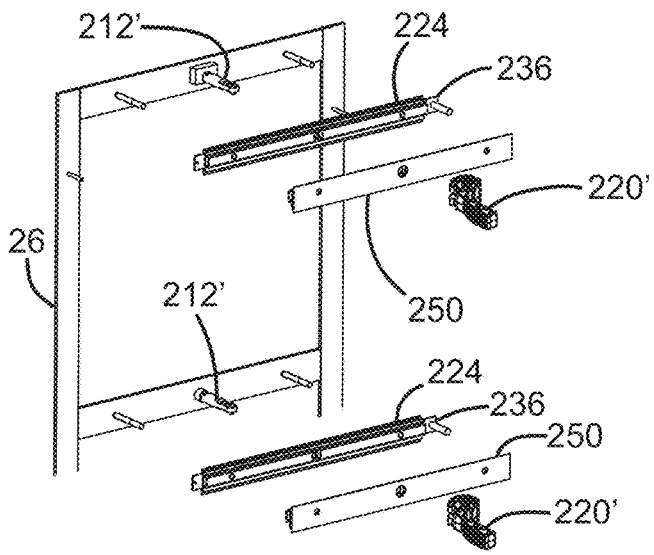
FIG. 45 is an exploded perspective view of a variation of the system of FIGS. 9-19.
Figure 46:
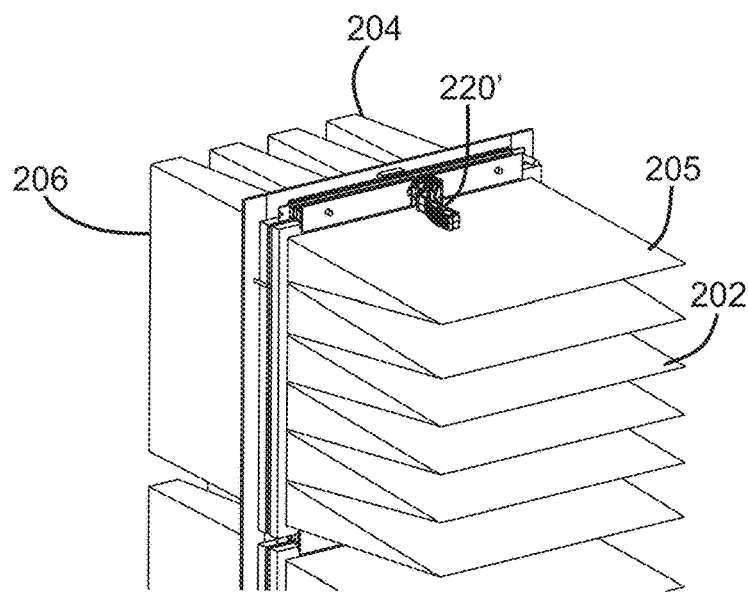
FIG. 46 is a perspective view of a portion of the system of FIG. 45.
Figure 47:
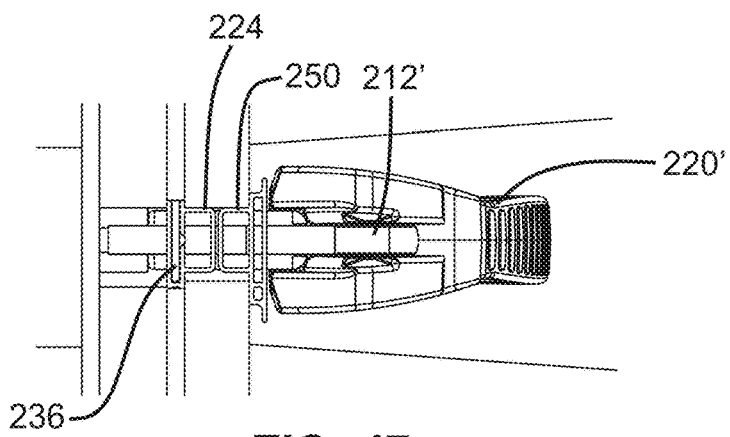
FIG. 47 is an enlarged cross-sectional view of a portion of FIG. 46.
Figure 48:
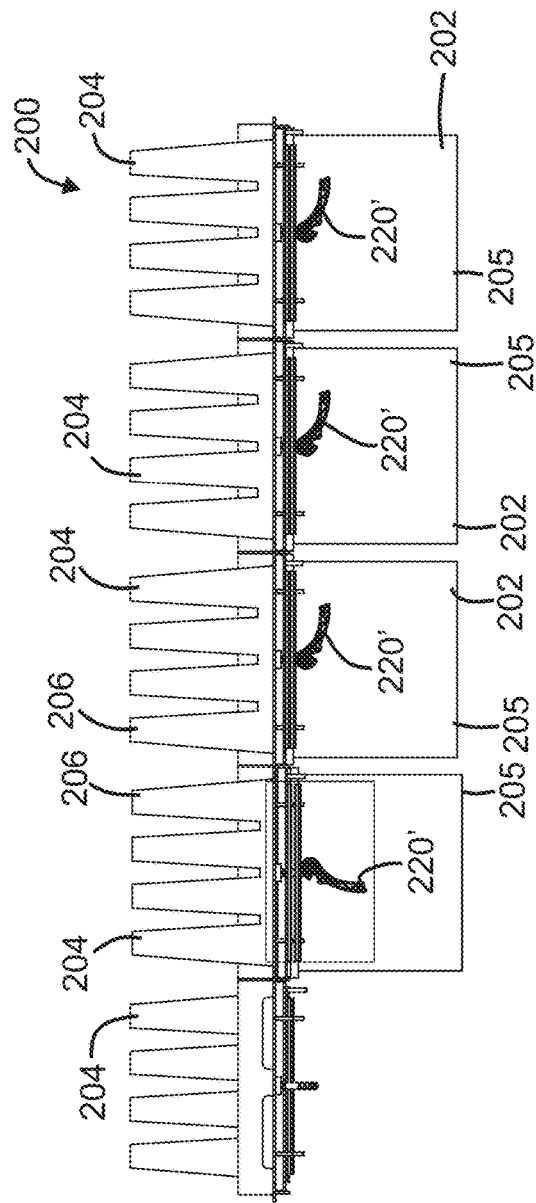
FIG. 48 is a top plan view of the system of FIG. 45.
Figure 49:
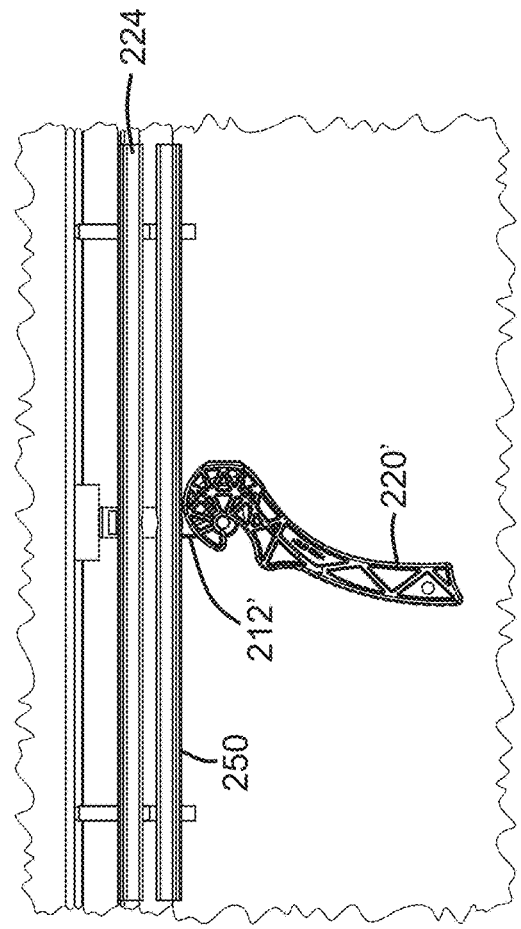
FIG. 49 is an enlarged view of a portion of FIG. 48.
Figure 50:
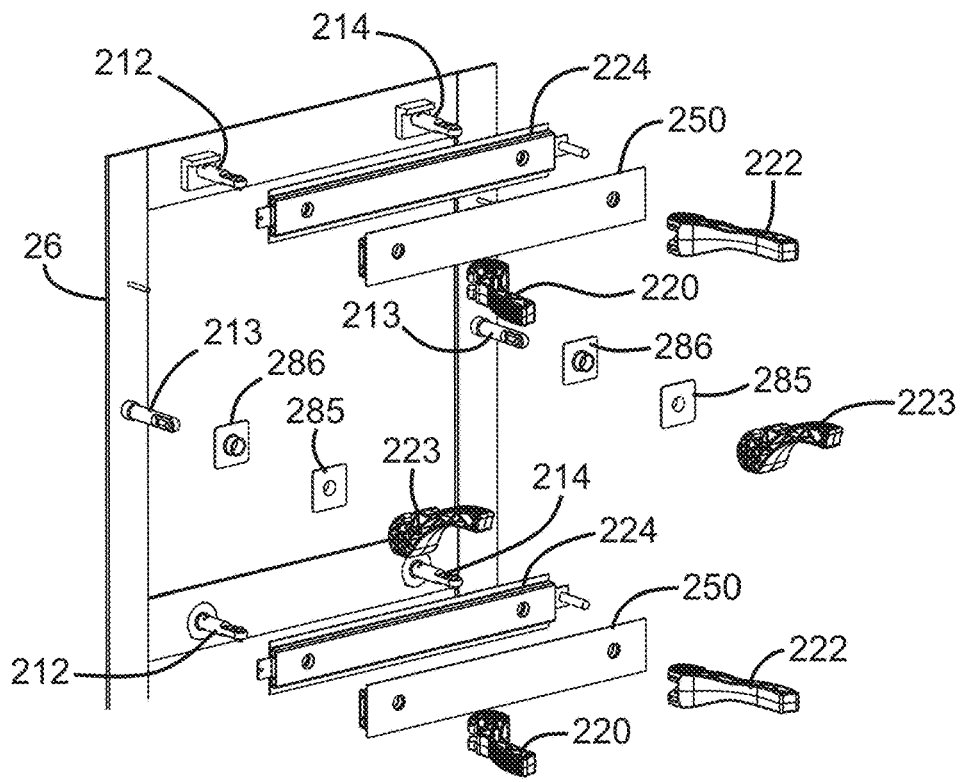
FIG. 50 is an exploded perspective view of a variation of the system of FIGS. 9-19.
Figure 51:
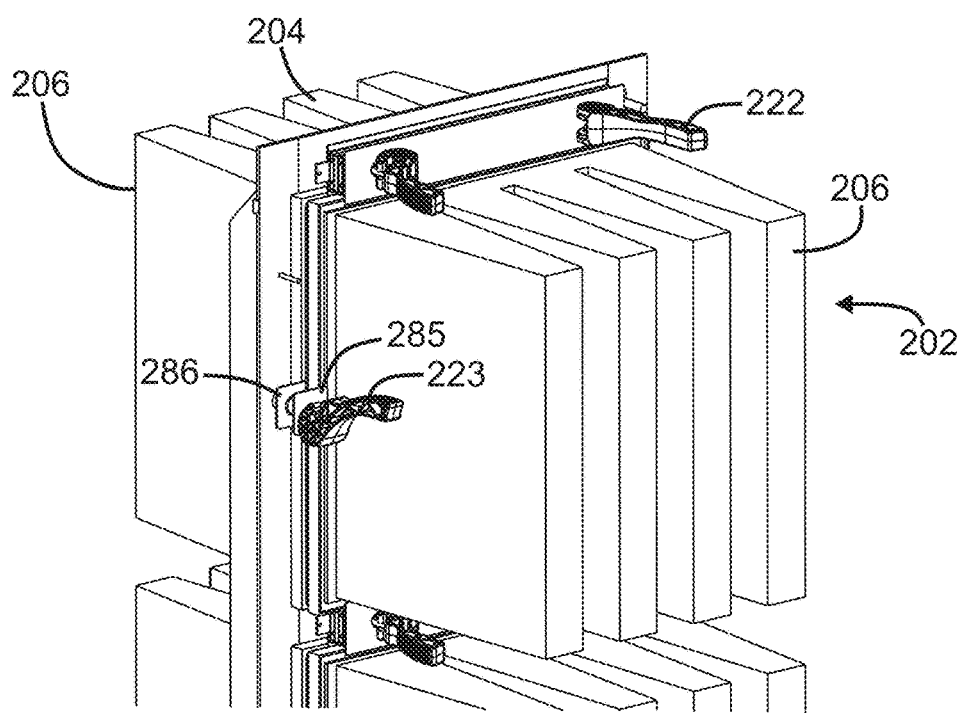
FIG. 51 is a perspective view of a portion of the system of FIG. 50.
Figure 52:
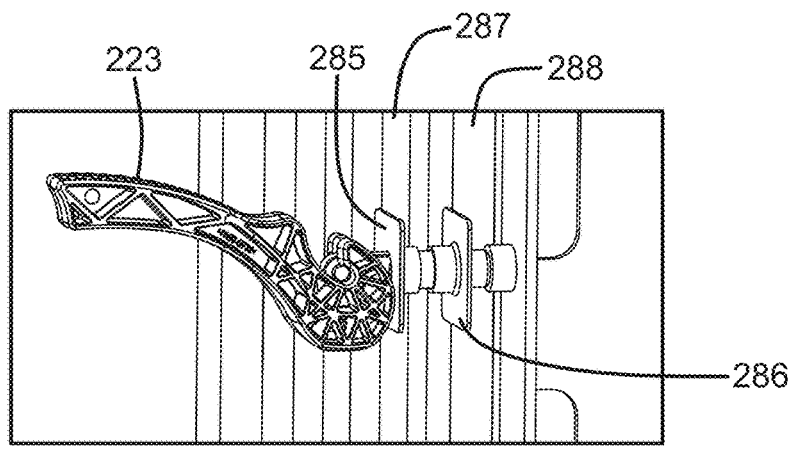
FIG. 52 is an enlarged cross-sectional view of a portion of FIG. 51.
Figure 53:
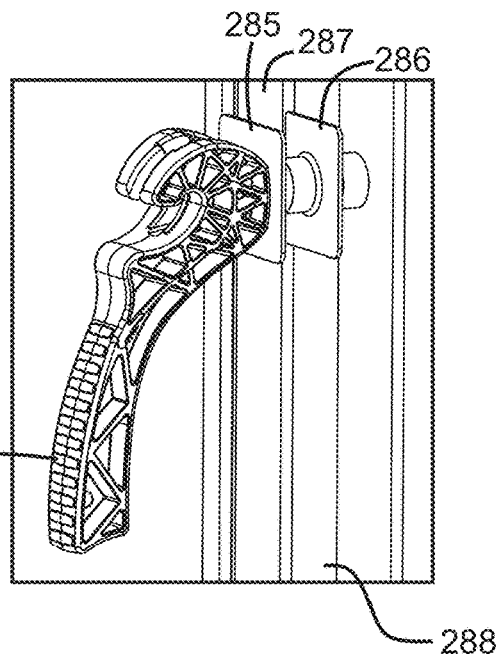
FIG. 53 is an enlarged cross-sectional view of a portion of FIG. 51.
Figure 54:
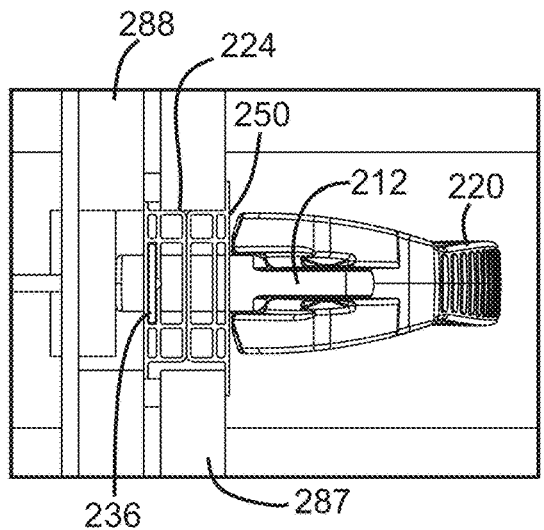
FIG. 54 is an enlarged cross-sectional view of a portion of FIG. 51.
Figure 55:
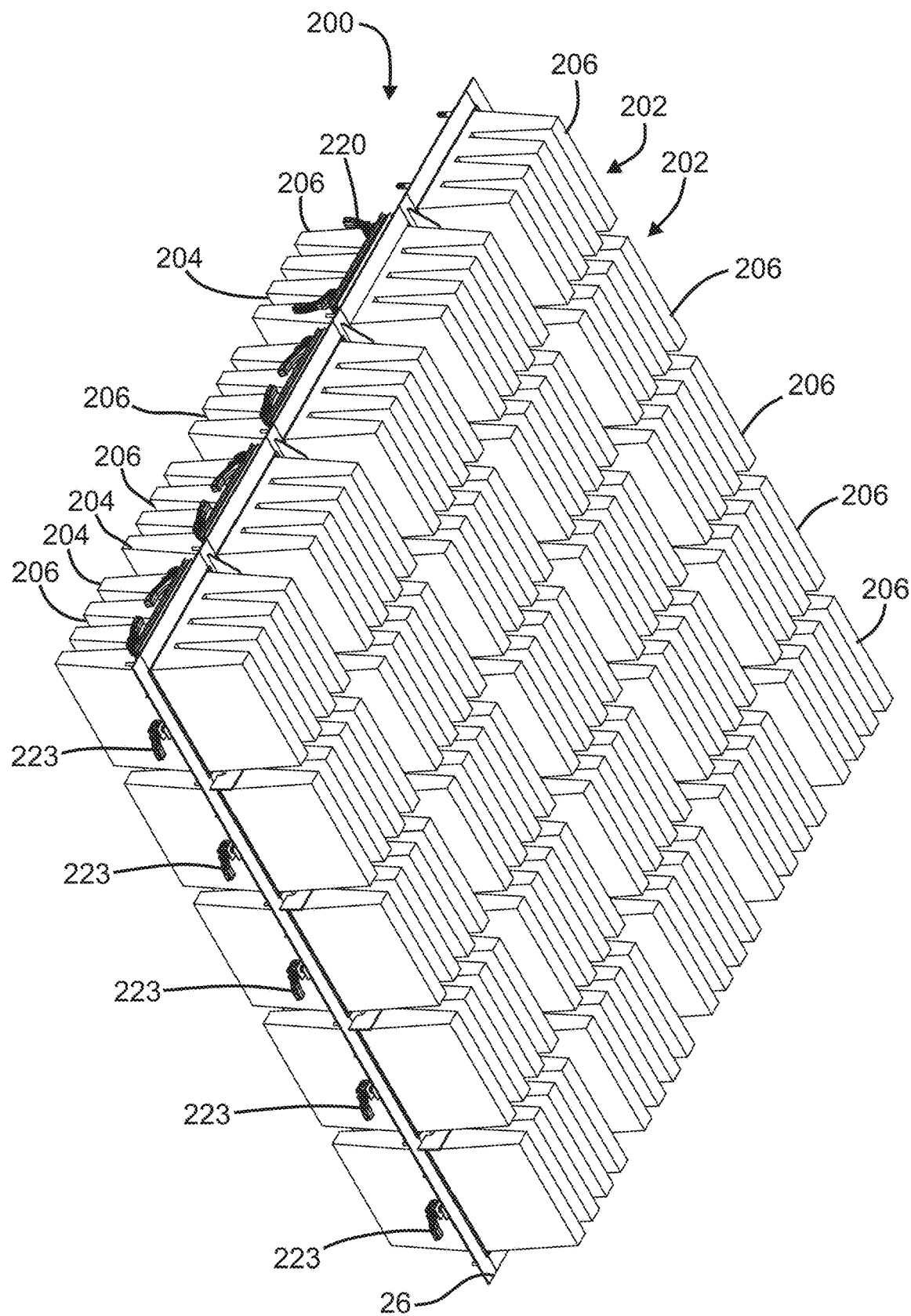
FIG. 55 is a perspective view of the system of FIG. 51.
Figure 56:
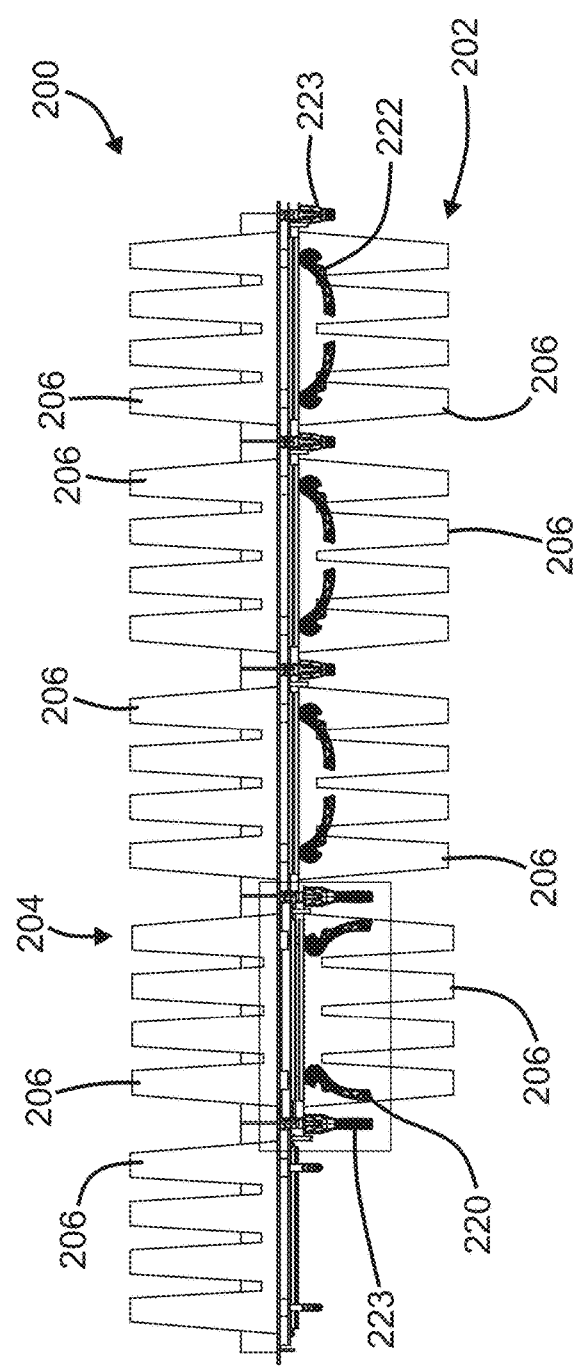
FIG. 56 is a top plan view of the system of FIG. 55.
Figure 57:
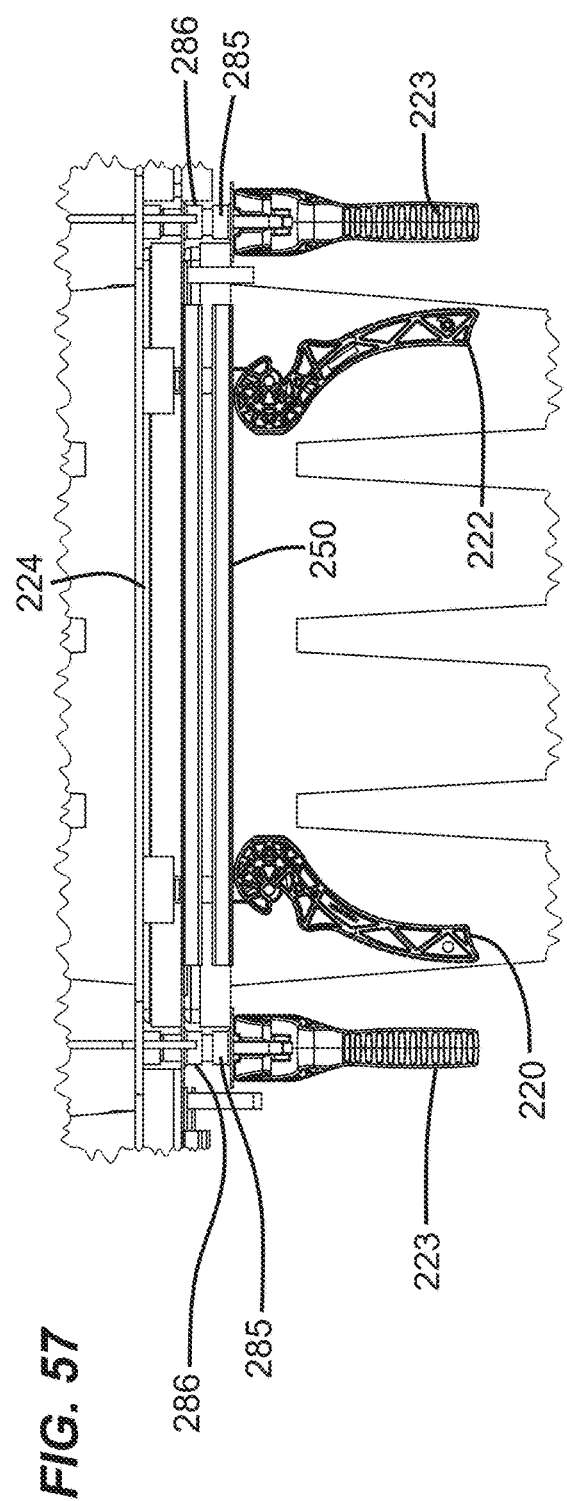
FIG. 57 is an enlarged view of a portion of FIG. 56.

In reference now to FIGS. 20-39, an alternative embodiment for the clamp system 210 is provided, depicted generally at 201'. The difference between the clamp system 210 and clamp system 210' is the existence of a second slide plate 300 (FIG. 38). The second slide plate 300 is held by the second support tube 250 and is positioned over the clamp rods 212, 214. The second slide plate 300 includes an end handle 302 projecting generally perpendicular to a remaining portion thereof. In this system, after the hand grips 220, 222 are rotated into the locked position, both the first slide plate 236 and second slide plate 300 are moved or slid into the locked position, in which the first slide plate 236 secures that gasket 203 of the second filter element 204 into a sealed position, and the second slide plate 300 secures the gasket 201 of the first filter element 202 into a sealed position, after that, the hand grips 220, 222 are removable from the overall system, and both the first filter element 202 and the second filter element 204 are secured in place. The motion to move the first slide plate 236 and second slide plate 300 to the locked position includes moving the slide plates 236, 300 laterally outwardly, in a direction away from the filter elements 202, 204. In the example shown, the end handles 246, 302 are on opposite sides of the elements 202, 204 and are moved away from each other when being moved to the locked position. In other embodiments, this motion could be reversed—that is, instead of moving the slide plates 236, 300 laterally away from each other to the locked position, they could be designed oppositely so that moving the slide plates 236, 300 laterally toward each other results in the locked position.

When the system of FIGS. 20-39 is serviced, the second slide plate 300 is slid by moving it inwardly toward a direction of the first filter element 202 and second filter element 204. This will allow the second support tube 250 to be lifted or pivoted and remove the first filter element 202. A replacement first filter element 202 then can then be provided and oriented with the gasket 201 between the first support tube 224 and the second support tube 250. The hand grips 220, 222 can then again be engaged with the rods 212, 214 and rotated to compress the second support tube 250 against the gasket 201 of the first filter element 202. The second slide plate 300 can then be moved to lock the first filter element 202 into a sealed position.

Occasionally, the second filter element 204 will also be replaced, and, after removing the first filter element 202 as described above, the second filter element 204 can be removed and replaced, as described in detail with respect to the embodiment of FIGS. 9-19.

The Example Embodiment of FIGS. 40-44

FIGS. 40-44 show a variation of the embodiment of FIGS. 9-19, with the same reference numerals being used to show similar parts. In this embodiment, instead of having the second support member 250, there is a second support member 250' having the same profile shape as the first elongated support member 224.

The Example Embodiment of FIGS. 45-49

FIGS. 45-49 show a variation of the embodiment of FIGS. 9-19, with the same reference numerals being used to show similar parts. In this embodiment, instead of having a pair of handgrips 220, 222, there is a single handgrip 220' centered on the support members 224, 250. There is also only a single clamp rod 212' fixed to the grid 26, horizontally centered for each filter 204, 205.

The Example Embodiment of FIGS. 50-57

FIGS. 50-57 show a variation of the embodiment of FIGS. 9-19, with the same reference numerals being used to show similar parts.

In this embodiment, both the first filter element 202 and the second filter element 204 are V-bank filter elements 206. There is greater horizontal and vertical spacing between each element 206, than in the embodiment of FIGS. 9-19, one of the purposes being to accommodate additional handgrips, as explained below.

The system 200 includes handgrips 223 along the lateral sides of each element 206 to help hold the elements 206 in place on the frame 26. Extending from vertically members of frame 26 are connector rods 213 that engage with handgrips 223. There are also clamp members 285, 286 to help clamp the elements 206 in place against the element frame headers 287, 288.

Figure 58:
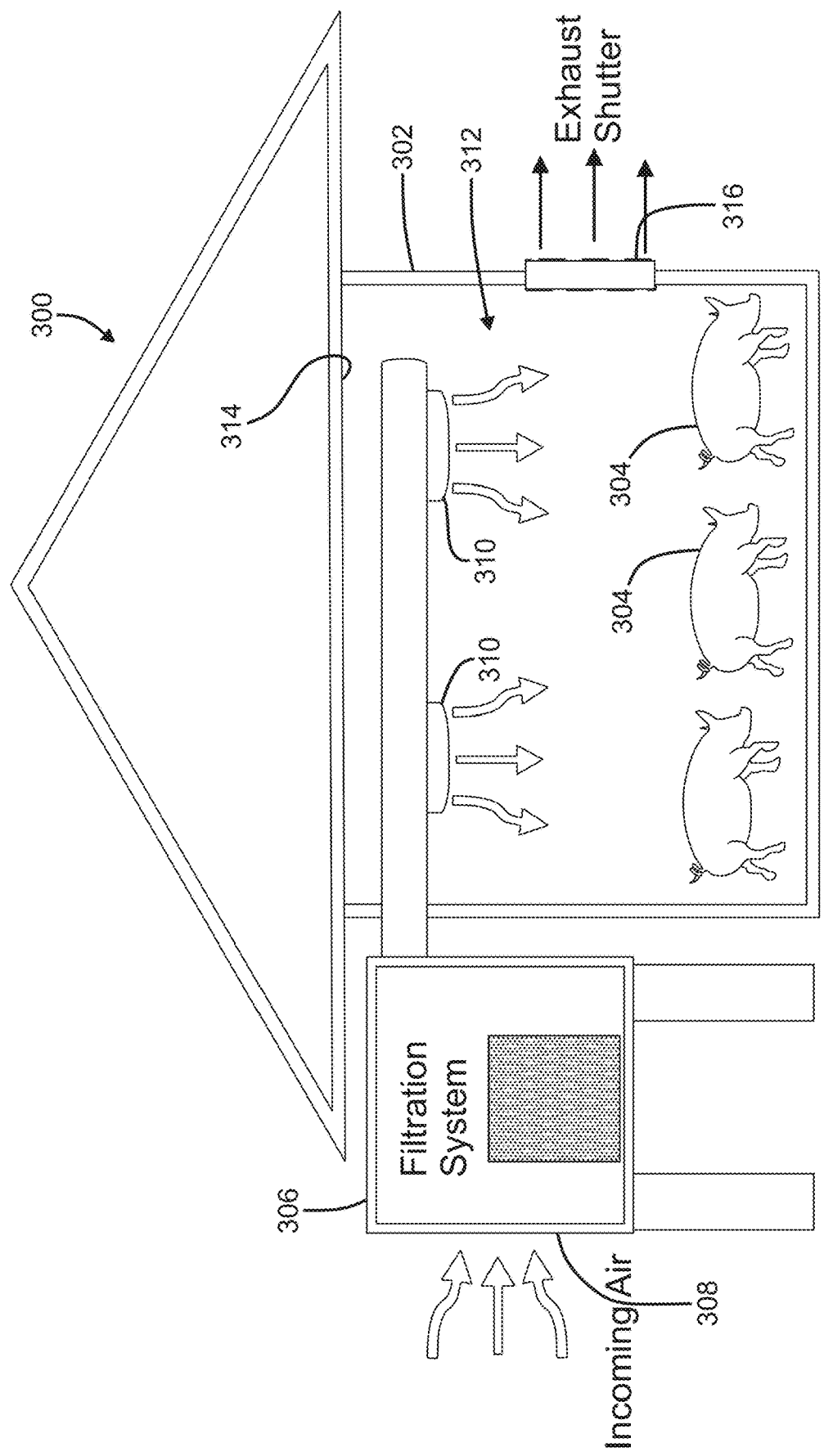
FIG. 58 is a schematic view of an example system utilizing one or more of the filtration systems and components of FIG. 1-57.

The Example Embodiment of FIG. 58

The air filtration systems above can be used in a variety of environments and systems. For example, the air filtration systems described above can be used to filter incoming air to prevent airborne viruses. Such applications can include livestock environments, such as swine farms, poultry, and other livestock in which airborne viruses could transmit.

Static positive pressure air filtration systems using small turbine units can be used. Filter elements with filtration ratings from MERV 14 to HEPA can be applied to capture relevant airborne viruses. One unit can providing 250,000 CFM with 90 filter elements, and multiple units can be configured to meet overall air flow requirements based on livestock population to be housed.

In the prior art, a negative pressure air filtration with under 0.2 inch of water of pressure differential for sizing of the system is used. In these prior art systems, to provide high efficiency filtration and required flow, a significantly large systems are required. The systems described in this disclosure are about ⅓ of the size of prior art solutions with significantly reduced maintenance and operational resources.

Using the air filtration systems of FIGS. 1-57, a positive pressure filtration system is used, which results in a smaller system, and has advantages of ease of maintenance and better security during changeover. It will have up to 1.0 inch of water positive pressure differential, and less than 300 filter units.

In reference now to FIG. 58, a system is shown at 300 having a livestock barn 302. The barn 302 can be for a variety of livestock such as swine 304, or can be for poultry (e.g., chickens, turkeys), sheep, goats, cattle/bovines, horses, etc.

The system 300 includes filtration system 306, which can include any of the systems described above in connections with FIGS. 1-57. The filtration system 306 draws in air from the outside atmosphere at an inlet region 308. The air is filtered to remove contaminants, including viruses, and the filtered air exits through an outlet region 310 in the interior 312 of the barn 302. As shown here, the outlet region 310 is adjacent a ceiling 314 of the livestock area in the interior 312 of the barn 302. Interior air from the interior 312 of the barn 302 is exhausted to the outer atmosphere from the barn 302 through an exhaust shutter 316.

The above provides example principles of operation. Many embodiments can be made using these principles.

What is claimed is:

1. A clamp system for releasably attaching a filter assembly to a support grid; the clamp system comprising:
- (a) an elongated support tube with first and second opposite open ends, a first slide channel adjacent the first end; and a second slide channel adjacent the second end;
- (b) a first clamp slidably mounted in the first open end;
- (c) a second clamp slidably mounted in the second open end;
- (d) a first slide pin arrangement slidably mounted in the first slide channel between a locked and a released position;
- (e) a second slide pin arrangement slidably mounted in the second slide channel between a locked and a released position;
- (f) an elongated omega clamp removably mounted to cover the support tube; the omega clamp having first and second spaced through slots;
  - (i) the first through slot slidably accommodating a portion of the first slide pin arrangement;
  - (ii) the second through slot slidably accommodating a portion of the second slide pin arrangement;
- (g) first and second pivot rods extending through and connecting the omega clamp and the support tube; the first and second pivot rods each having a hinge point in the support tube and a pivot axis along a length of the support tube between the first and second open ends of the support tube;

wherein, when the first and second slide pin arrangements are slid to the released position, the omega clamp is free to be pivoted with the first and second pivot rods along the pivot axis away from covering the support tube.

2. The clamp system of claim 1 further including a separate maintenance tool constructed and arranged to engage each of the first and second pivot rods and apply an axial force against the omega clamp.

3. The clamp system of claim 2 wherein the maintenance tool comprises:
- (a) a head defining a recess sized to engage the first and second pivot rods, and a cam surface on a portion of the head opposite of the recess; and
- (b) a grasping handle extending from the head.

4. The clamp system of claim 1 wherein each of the first and second pivot rods includes a barrel nut on a portion of the pivot rods opposite of the hinge point.

5. The clamp system of claim 1 wherein each of the first clamp and second clamp includes:
- (a) a slide rod sized to be slidably received within one of the first and second open ends of the support tube:
- (b) a post secured to and perpendicular to the slide rod; and
- (c) a flange secured to a distal portion of the post and parallel to and facing the slide rod to form a gasket holding recess therebetween.

6. The clamp system of claim 1 wherein each of the first and second slide pin arrangements includes:
- (a) a pin slide rod sized to slide within one of the first and second slide channels:
- (b) a support secured to and perpendicular to the pin slide rod:
- (c) a pin flange secured to a distal portion of the support and parallel to the pin slide rod with an interior side facing the pin slide rod and an opposite exterior side; and
- (d) pin projecting from the exterior side and sized to slide within one of the first and second slots in the omega clamp.

7. The clamp system claim 1 wherein the omega clamp comprises:
- (a) a base with a pair of legs extending perpendicular to the base;
  - (i) the base defining the first and second through slots;
  - (ii) the base having an exterior side and an opposite interior side;
- (b) each of the legs being bent at a non-zero angle remote from the base and away from each other; the legs and the interior side of the base defining an open channel; and
- (c) first and second pin slider keepers secured to the interior side of the base and overlapping a portion of the first and second through slots.

8. The clamp system of claim 6 wherein the omega clamp comprises:
- (a) a base with a pair of legs extending perpendicular to the base;

(i) the base defining the first and second through slots:
(ii) the base having an exterior side and an opposite interior side:
(b) each of the legs being bent at a non-zero angle remote from the base and away from each other: the legs and the interior side of the base defining an open channel; and
(c) first and second pin slider keepers secured to the interior side of the base and overlapping a portion of the first and second through slots:
(i) the first and second pin slider keepers being sized to slidably receive one of the pin flanges to put the first and second slide pin arrangements in the locked positions; and
wherein when the first and second slide pin arrangements are slid to the released position, each of the pin flanges are slid to be free of the first and second pin slider keepers, and the omega clamp is free to be pivoted with the first and second pivot rods along the pivot axis away from covering the support tube.

9. A clamp system for releasably attaching a filter assembly to a support grid; the clamp system comprising:
(a) one or more clamp rods;
(b) a first elongated support member with openings, each opening being sized to fit over one of the clamp rods;
(c) a first slide plate slidably mounted in the first support member;
(i) the first slide plate having openings alignable with the openings in the first support member;
(ii) the first slide plate having an end handle;
(c) a second elongated support member with openings, each opening in the second support member sized to fit over one of the clamp rods; and
(d) one or more handgrips, each handgrip constructed and arranged to engage one of the clamp rods and apply an axial force against the second support member.

10. The clamp system of claim 9 further comprising:
(a) a second slide plate slidably mounted in the second support member;
(i) the second slide plate having openings alignable with the openings in the second support member; and
(ii) the second slide plate having an end handle.

11. The clamp system of claim 9 wherein the handgrips each comprises:
(a) a head defining a recess sized to engage one of the clamp rods, and a cam surface on a portion of the head opposite of the recess; and
(b) a grasping handle extending from the head.

12. The clamp system of claim 9 wherein
(a) the first support member has a rectangular cross-sectional wall with opposite open ends, and the openings in the first support member extend through opposing sides of the wall; and
(b) the second support member has a rectangular cross-sectional wall with opposite open ends, and the openings in the second support member extend through opposing sides of the wall of the second support member.

13. The clamp system of claim 9 wherein the first slide plate openings have a narrowed region and a wider region.

14. The clamp system of claim 10 wherein the second slide plate openings have a narrowed region and a wider region.

15. A filter system comprising:
(a) a support grid having a frame with opposite upstream and downstream sides;
(b) a first filter element oriented along the upstream side of the support grid;
(c) a second filter element oriented on the support grid on the downstream side directly across and opposing the first filter element; and
(d) a single clamp system releasably securing both the first filter element and the second filter element to the frame;
(e) a plurality of clamp rods extending from the support grid;
(f) a first elongated support member holding a first slide plate and positioned over the clamp rods;
(i) the first support member being positioned against the second element gasket; and
(g) a second elongated support member positioned over the clamp rods and against the first element gasket, such that the first element gasket is positioned between and against the first support member and second support member.

16. The filter system of claim 15 wherein:
(a) the second filter element has a second element gasket pressed against the upstream side of the support grid; and
(b) the first filter element has a first element gasket pressed against the clamp system.

17. The filter system of claim 15 further including a plurality of handgrips removably secured to the clamp rods and applying an axial force against the second support member.

18. The filter system of claim 15 further comprising a second slide plate being held by the second support member and positioned over the clamp rods.

19. The filter system of claim 15 wherein:
(a) there are a plurality of first filter elements on the upstream side of the support grid;
(b) the first filter elements comprise pocket filter elements or V-bank filter elements;
(c) there are a plurality of second filter elements on the downstream side of the support grid; and
(d) the second filter elements comprise V-bank filter elements.

* * * * *